US006204879B1

(12) United States Patent
Koseki et al.

(10) Patent No.: US 6,204,879 B1
(45) Date of Patent: Mar. 20, 2001

(54) IMAGING DISPLAY SYSTEM HAVING AT LEAST ONE SCAN DRIVING SIGNAL GENERATOR AND MAY INCLUDE A BLOCK THINNING-OUT SIGNAL AND/OR AN ENTIRE IMAGE SCANNING SIGNAL

(75) Inventors: Hiroaki Koseki, Kokubunji; Toshihide Yamaoka, Akishima; Kuniaki Saito, Tokorozawa; Osamu Inagaki, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/903,362

(22) Filed: Jul. 30, 1997

(30) Foreign Application Priority Data

| Jul. 31, 1996 | (JP) | 8-202280 |
| Jan. 29, 1997 | (JP) | 9-014984 |
| Jul. 2, 1997 | (JP) | 9-177079 |

(51) Int. Cl.[7] .................................................. H04N 5/335
(52) U.S. Cl. ....................... 348/230; 348/320; 348/333.11
(58) Field of Search .................................. 348/230, 312, 348/320, 322, 333

(56) References Cited

U.S. PATENT DOCUMENTS

| 4,539,598 | * | 9/1985 | Dietrich et al. | 348/319 |
| 4,541,010 | * | 9/1985 | Alston | 348/333 |
| 4,876,590 | * | 10/1989 | Parulski | 348/333 |
| 4,942,473 | * | 7/1990 | Zeevi et al. | 348/281 |
| 5,058,190 | * | 10/1991 | Levitt et al. | 348/324 |
| 5,196,939 | * | 3/1993 | Elabd et al. | 348/314 |
| 5,262,871 | * | 11/1993 | Wilder et al. | 348/307 |
| 5,365,276 | * | 11/1994 | Imai et al. | 348/556 |
| 5,412,422 | * | 5/1995 | Yamada et al. | 348/218 |

FOREIGN PATENT DOCUMENTS

| 2-107087 | 4/1990 | (JP) . |
| 6-350906 | 12/1994 | (JP) . |
| 9-135390 | 5/1997 | (JP) . |

* cited by examiner

Primary Examiner—Wendy Garber
Assistant Examiner—Mitchell White
(74) Attorney, Agent, or Firm—Volpe and Koenig, P.C.

(57) ABSTRACT

An imaging display system including: an imaging apparatus including an X-Y addressing type solid-state imaging device, a motion detector for specifying a partial area within the whole image area of the solid-state imaging device, a block scan driving signal generator for generating a driving signal used to scan the pixels in a block, that is, an area specified by the motion detector, a thinning-out scan driving signal generator for generating a driving signal used to scan the pixels in the whole image area of the solid-state imaging device while thinning them at a given thinning ratio, and a driving signal switching unit for switching the block scan driving signal and thinning-out scan driving signal; and a display apparatus including a memory for storing picture information transmitted from the imaging apparatus, and a display unit for displaying a picture corresponding to the picture information stored in the memory.

7 Claims, 19 Drawing Sheets

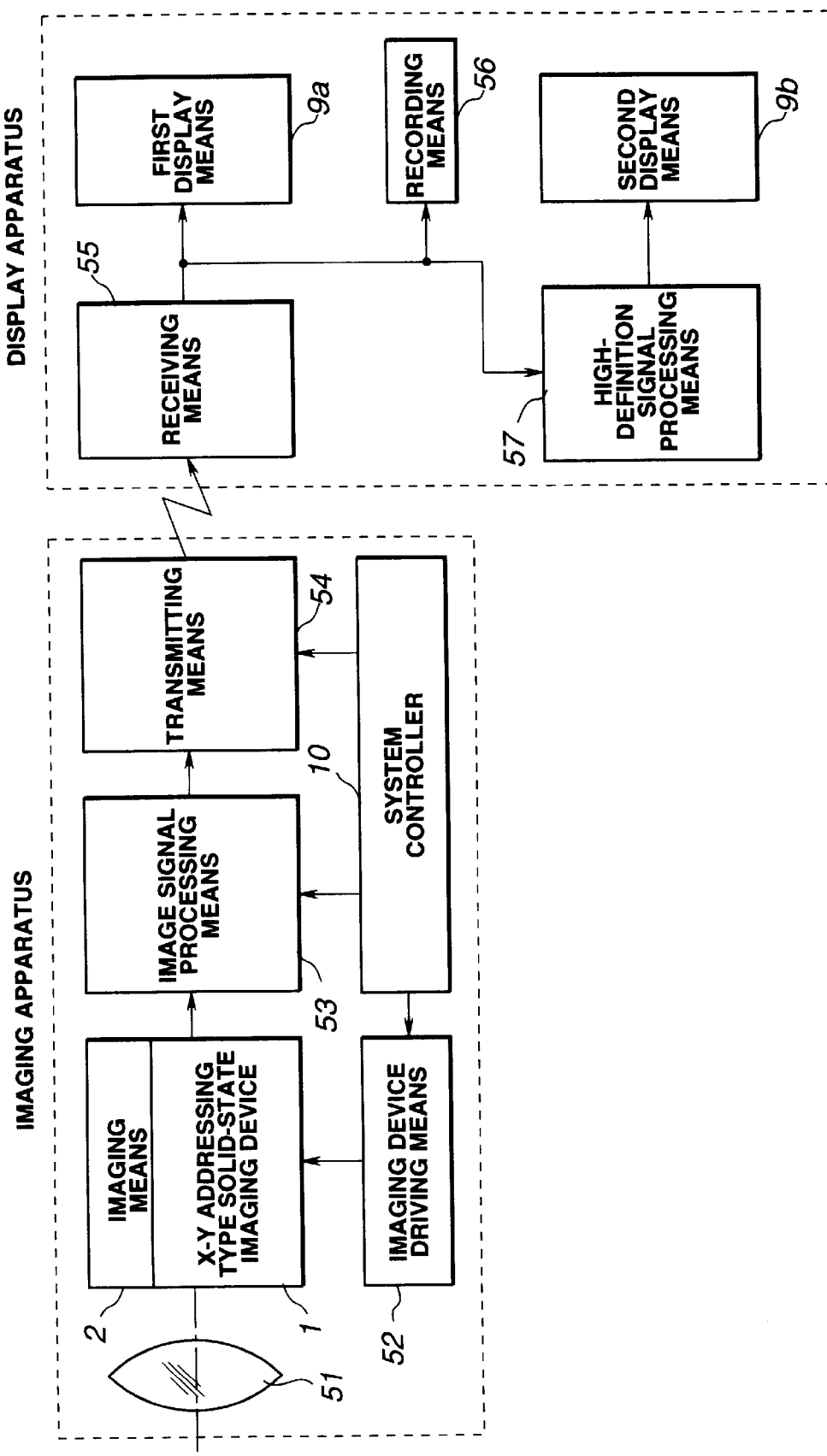

| STANDARD SIGNALING SYSTEM | | |
|---|---|---|
| | MONOCHROME | COLOR |
| 525 LINES 60 FIELDS | EIA SYSTEM | NTSC SYSTEM |
| 625 LINES 50 FIELDS | CCIR SYSTEM | PAL SYSTEM |
| | | SECAM SYSTEM |

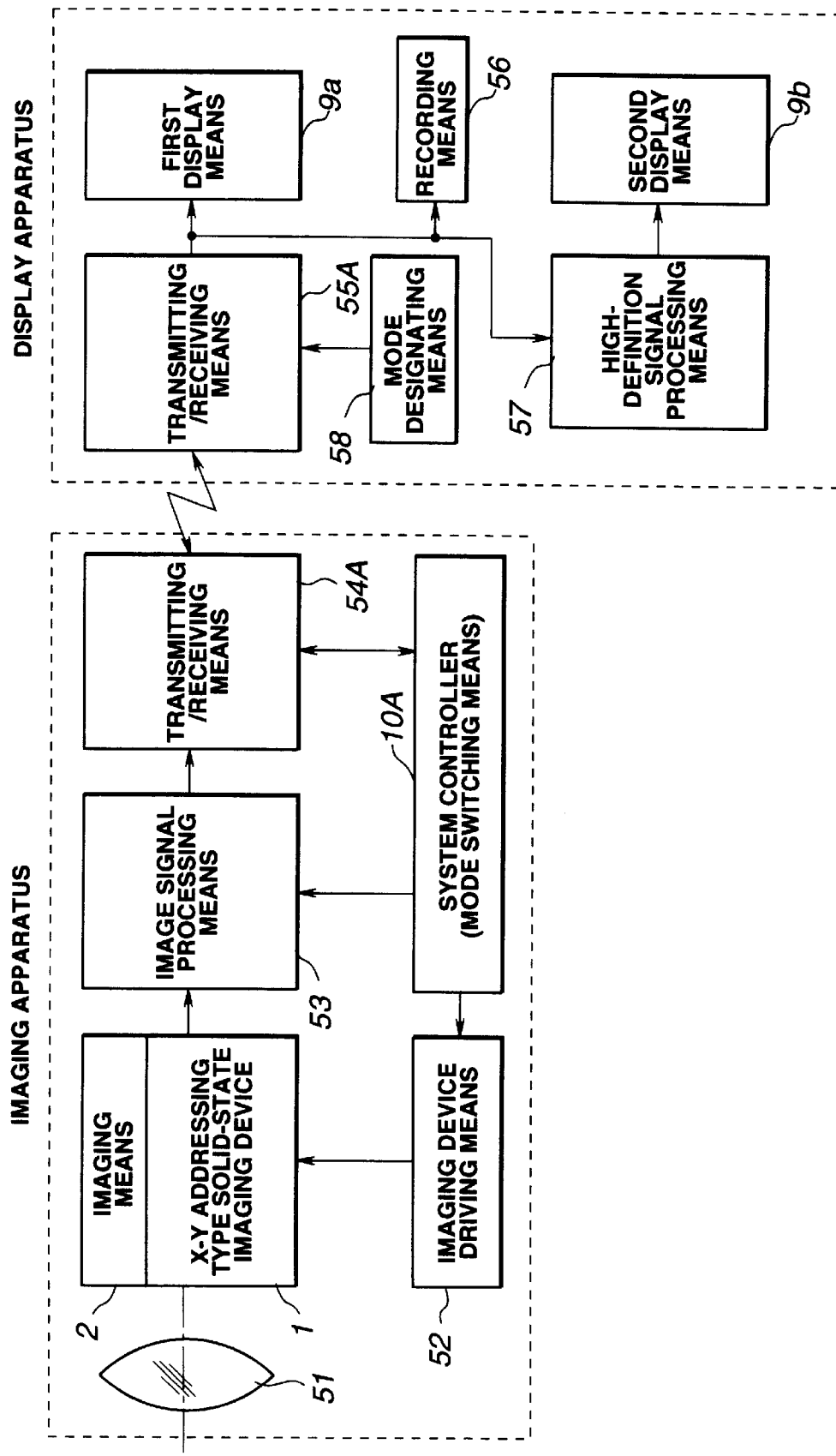

FIG.23

|   |   |   |   |   |   |   |   |   |
|---|---|---|---|---|---|---|---|---|
| 1 | 1 | 1 |   | 1 | 1 | 1 |   |   |
| 1 | 1 | 1 |   | 1 | 1 | 1 |   |   |
| 1 | 1 | 1 |   | 1 | 1 | 1 |   |   |
|   |   |   |   |   |   |   |   |   |
| 1 | 1 | 1 |   | 1 | 1 | 1 |   |   |
| 1 | 1 | 1 |   | 1 | 1 | 1 |   |   |
| 1 | 1 | 1 |   | 1 | 1 | 1 |   |   |
|   |   |   |   |   |   |   |   |   |
|   |   |   |   |   |   |   |   |   |

FIG.24

|   |   |   |   |   |   |   |   |   |
|---|---|---|---|---|---|---|---|---|
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
| 1 | 1 | 1 | 1 | 1 | 1 | 1 | 1 |   |
|   |   |   |   |   |   |   |   |   |

…

IMAGING DISPLAY SYSTEM HAVING AT LEAST ONE SCAN DRIVING SIGNAL GENERATOR AND MAY INCLUDE A BLOCK THINNING-OUT SIGNAL AND/OR AN ENTIRE IMAGE SCANNING SIGNAL

BACKGROUND OF THE INVENTION

1. Field of the Invention

The present invention relates to an imaging display system, or more particularly, to an imaging display system for transmitting picture information acquired by an imaging apparatus to a display apparatus and for displaying a picture.

2. Description of the Related Art

In the past, a picture display method for displaying a motion picture which is implemented in a TV conference system or the like has employed various means for the purpose of reducing a total amount of information to be transmitted.

For example, Japanese Unexamined Patent Publication No. 2-107087 describes a picture display method to be implemented in a motion picture display system having a transmission apparatus for transmitting picture information input from a video input unit while storing it screen by screen in a memory, and a display apparatus for receiving the picture information from the transmission apparatus, storing it screen by screen in a memory, and then displaying it on a display unit. Herein, the transmission apparatus includes a transmitting means for transmitting whole picture information of a specific screen and picture information of given portions of the other screens in units of a plurality of screens stored in the memory. The display apparatus includes a means for outputting whole picture information of the specific screen out of all picture information stored in the memory to the display apparatus, and outputting picture information of the given portions of the other screens to the display unit, or synthesizing picture information of the other portions of the other screens and picture information of the specific screen and then outputting synthetic information to the display unit. Picture information input from the video input unit is displayed as a motion picture in units of the plurality of screens.

In this kind of system, for reading image data from a memory means in a transmission apparatus having the capability of an imaging apparatus, picture information of a portion of a screen depicting many motions is extracted and transmitted. As for a portion of the screen depicting few motions, information of a partial screen received in advance by a receiving side is utilized. Thus, even when an amount of information to be transmitted is reduced, an easy-to-see picture depicting smooth motions can be displayed.

However, in the system described in the Japanese Unexamined Patent Publication No. 2-107087, a memory means is included in the imaging apparatus having the capability of a transmission apparatus. This poses a problem that the imaging apparatus becomes large in size and costs more.

Moreover, a means is included for optimizing the way of outputting pixel data that has been written in the memory means. However, no measures are taken to reduce an amount of information which affects writing of an output of an imaging device in the memory means. That is to say, when an imaging device that cannot be accessed randomly, such as, a CCD is employed, it is necessary to output data of all pixels from the imaging device and write the data in the memory means. This leads to a longer time required for processing and to eventually a lowered frame rate. This poses a serious problem in the recent situation in which more and more imaging devices are enjoying a higher density of pixels.

Furthermore, when a range in a screen in which a subject makes motions is large or data of a whole screen is transmitted, it cannot be said that satisfactory measures are taken to reduce an amount of information to be transmitted.

Japanese Unexamined Patent Publication No. 6-350906 describes a picture signal synthesizing method in which an imaging device or an optical image formed on the imaging device is shifted in units of an integral submultiple of a pixel pitch in synchronization with a field or frame that means the time required for transmitting one half or a whole of a picture; n fields or frames, each of which means one half or a whole of a picture, produced by sampling n different sampled areas using one pixel opening during n fields or n frames are synthesized in order to produce a high-definition input picture. Herein, a luminance level of each sampled area is determined as a function of a sampled value of the sampled area relative to a sampled value of another sampled area to be sampled using the pixel opening designed to sample the sampled area.

In other words, according to the method described in the Japanese Unexamined Patent Publication No. 6-350906, partial pictures are produced while the imaging device is shifted, and then synthesized. Thus, using an imaging device having an ordinary number of pixels and having been used for multiple purposes in the past, a high-definition picture can be produced.

However, according to the method described in the Japanese Unexamined Patent Publication No. 6-350906, a means for shifting the imaging device is needed. This invites an increase in size of the imaging apparatus.

Furthermore, Japanese Unexamined Patent Publication No. 9-135390 describes an imaging apparatus comprising an imaging device having a light-receiving device area composed of a plurality of pixels, and an imaging device driving means for reading an optical charge signal from the imaging device. The imaging apparatus can switch a first driving mode, in which the driving means operates in a driving mode that is intended to utilize a signal output read from the imaging device instead of storing the output, into a second driving mode in which the driving means operates in a driving mode that is intended to record a signal read from the imaging device, or vice versa. In the first driving mode, data is read from part of the light-receiving device area. In the second driving mode, data is read from a light-receiving device area that is different at least partly from the light-receiving device area whose data is read in the first driving mode.

To be more specific, the imaging apparatus described in the Japanese Unexamined Patent Publication No. 9-135390 has the ability to select any one of block scan driving, skip scan driving, and all-pixel scan driving as a technique according to which the imaging device is driven by the imaging device driving means. For monitoring a subject using a display means, a driving technique permitting a high frame rate is selected. For imaging the subject, a technique for producing a high-definition picture, though a frame rate is low is adopted.

In the imaging apparatus described in the Japanese Unexamined Patent Publication No. 135390, it is hard to produce a high-definition picture at an ordinary frame rate. Moreover, there is difficulty in transmitting a high-definition picture produced at an ordinary frame rate to a display apparatus using a general-purpose communication means or the like. This is because a speed at which pictures are transmitted (or input or displayed) has its limitations, and as far as a high-definition picture is concerned, since an amount of information is large, a frame rate is lowered.

A conceivable configuration is such that a plurality of imaging apparatuses having relatively narrow fields of view are included for fine observation of an object. In this case, the plurality of imaging apparatuses must be viewed, and a plurality of recording means are needed for recording. The configuration is unsuitable for looking at a picture covering a whole field of view.

By the way, an imaging apparatus capable of producing a high-definition picture at a relatively high frame rate and outputting it as a motion picture has a special configuration and is therefore expensive. Moreover, when an imaging apparatus is designed to remotely transmit a high-definition picture at a relatively high frame rate, a special data line and input and output circuits for a network are needed. The imaging apparatus therefore becomes expensive.

In recent years, there has been a demand for the advent of an imaging display system designed for the purpose of, especially, monitoring and making it possible to view a motion picture produced at a high frame rate in a normal situation, to look at a high-definition picture if necessary, and to observe a dark subject clearly.

OBJECTS AND SUMMARY OF THE INVENTION

The first object of the present invention is to provide an imaging display system capable of reducing an amount of picture information to be transmitted to a display apparatus without inviting an increase in size of an imaging apparatus.

The second object of the present invention is to provide an imaging display system capable of reducing an amount of picture information to be transmitted to a display apparatus while making it possible to compactly design an imaging apparatus and reduce cost.

The third object of the present invention is to provide an imaging display system making it possible to compactly design an imaging apparatus and reduce cost without the necessity of including a memory means in the imaging apparatus.

The fourth object of the present invention is to provide an imaging display system capable of displaying a high-definition picture despite a small amount of picture information to be transmitted to a display apparatus.

The fifth object of the present invention is to provide an imaging display system capable of displaying an optimal picture by utilizing at least two kinds of scan driving signals properly.

The sixth object of the present invention is to provide an imaging display system capable of transmitting general information of a whole picture in a short period of time.

The seventh object of the present invention is to provide an imaging display system capable of automatically controlling switching of driving signals and giving proper control.

The eighth object of the present invention is to provide an imaging display system capable of coping with motions made by a subject efficiently.

The ninth object of the present invention is to provide an imaging display system enabling an operator to specify a partial area within a whole image area, and capable of reflecting the operator's will effectively.

The tenth object of the present invention is to provide an imaging display system capable of carrying out processing more efficiently.

The eleventh object of the present invention is to provide an imaging display system enabling a plurality of operators to observe the same remotely-located object through display apparatuses.

The twelfth object of the present invention is to provide an imaging display system capable of transmitting picture information, which enables reconstruction of a high-definition picture, to a display apparatus.

The thirteenth object of the present invention is to provide an imaging display system capable of reconstructing a high-definition picture on the basis of picture information transmitted from an imaging apparatus.

The fourteenth object of the present invention is to provide an imaging display system in which an imaging apparatus can transmit picture information that enables reconstruction-of a high-definition picture, and a display apparatus having received the picture information can reconstruct and display a corresponding picture.

The fifteenth object of the present invention is to provide an imaging display system capable of selecting either of a state in which a high-definition picture can be viewed and a state in which a bright picture can be viewed according to which state is needed.

The sixteenth object of the present invention is to provide an imaging display system enjoying good maneuverability.

The seventeenth object of the present invention is to provide an imaging display system enabling use of a general-purpose transmitting means, receiving means, and display means and capable of being configured inexpensively.

The eighteenth object of the present invention is to provide an imaging display system capable of coping with any modified order in which specific pixels are shifted.

The nineteenth object of the present invention is to provide an imaging display system capable of being configured simply without the necessity of separately including a configuration for transmitting index information.

Briefly, the present invention provides an imaging display system for transmitting picture information acquired by an imaging apparatus to a display apparatus and displaying a picture corresponding to the transmitted picture information on the display apparatus. The imaging apparatus includes an X-Y addressing type solid-state imaging device, a scan driving signal generating means for generating at least two kinds of scan driving signals used to scan pixels in an image area of the solid-state imaging device, and a driving signal switching means for switching the at least two kinds of scan driving signals so as to select one scan driving signal. The display apparatus includes a memory means for storing picture information that is scanned in response to one of the at least two kinds of scan driving signals, which is selected by the driving signal switching means, and that is output from the solid-state imaging device, and a display means for displaying a picture corresponding to the picture information stored in the memory means.

These as well as other objects and advantages of the present invention will become further apparent from the following detailed explanation.

BRIEF DESCRIPTION OF THE DRAWINGS

FIG. 12 is a block diagram showing the configurations of an imaging apparatus and display apparatus included in an imaging display system of the fourteenth embodiment of the present invention;

FIG. 21 is a block diagram showing the configurations of an imaging apparatus and display apparatus included in an imaging display system of the sixteenth embodiment of the present invention;

FIG. 23 is a diagram for explaining another example of the mode intended to add up and read outputs of a plurality of adjoining pixels in the sixteenth embodiment; and FIG. 24 is a diagram for explaining another example of the mode intended to add up and read outputs of a plurality of adjoining pixels in the sixteenth embodiment.

DESCRIPTION OF THE PREFERRED EMBODIMENTS

Figure 1:
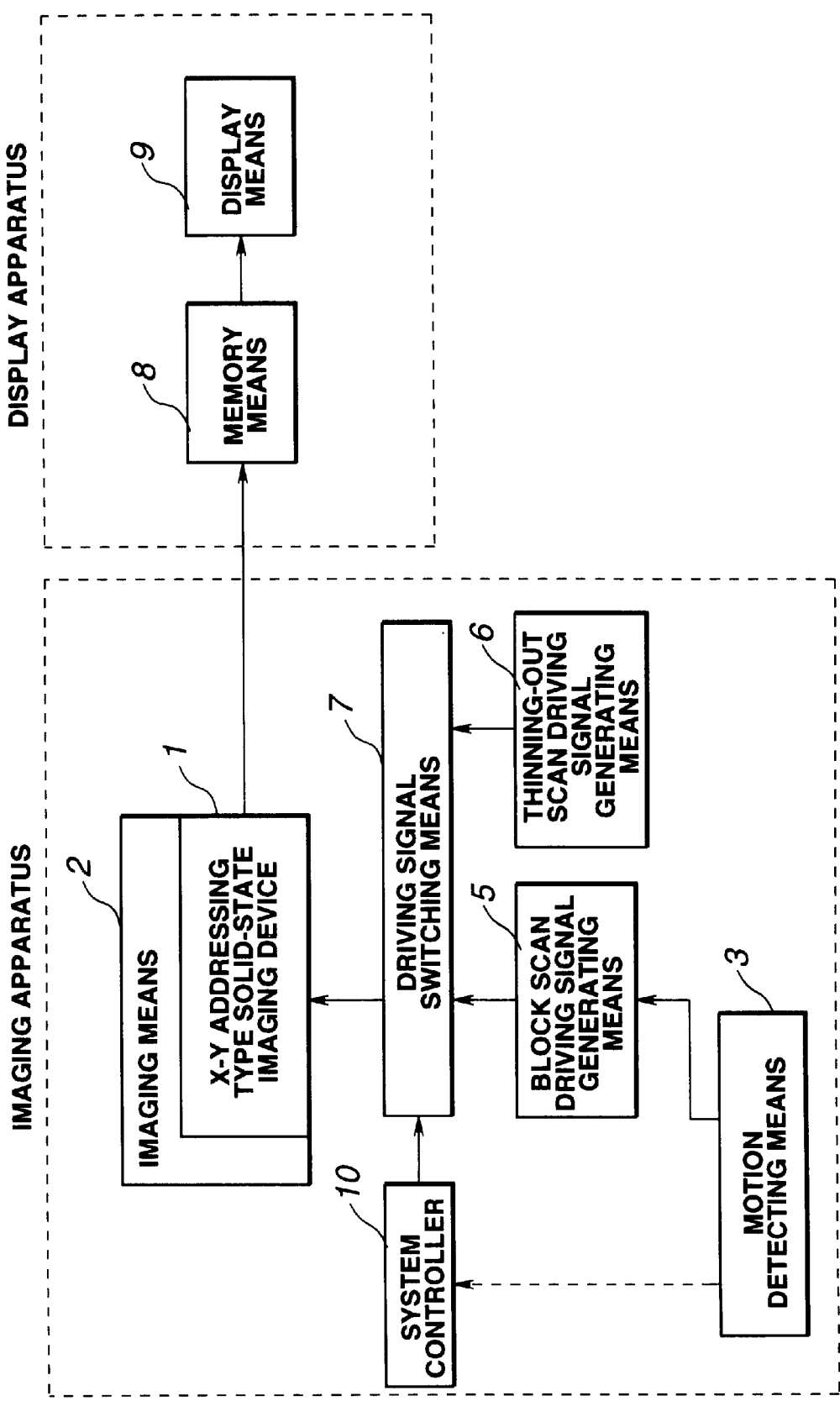
FIG. 1 is a block diagram showing the configurations of an imaging apparatus and display apparatus included in an imaging display system of the first or second embodiment of the present invention.

Referring to the drawings, embodiments of the present invention will be described below.

In embodiments shown in FIGS. 1 to 7, an imaging apparatus selects a display picture by detecting motions represented by picture information. In embodiments shown in FIGS. 8 to 11, it is an operator of a display apparatus who selects a display picture. In embodiments shown in FIGS. 12 to 24, an imaging apparatus can transmit standard picture information and a display apparatus can reconstruct a high-definition picture.

Figure 2:
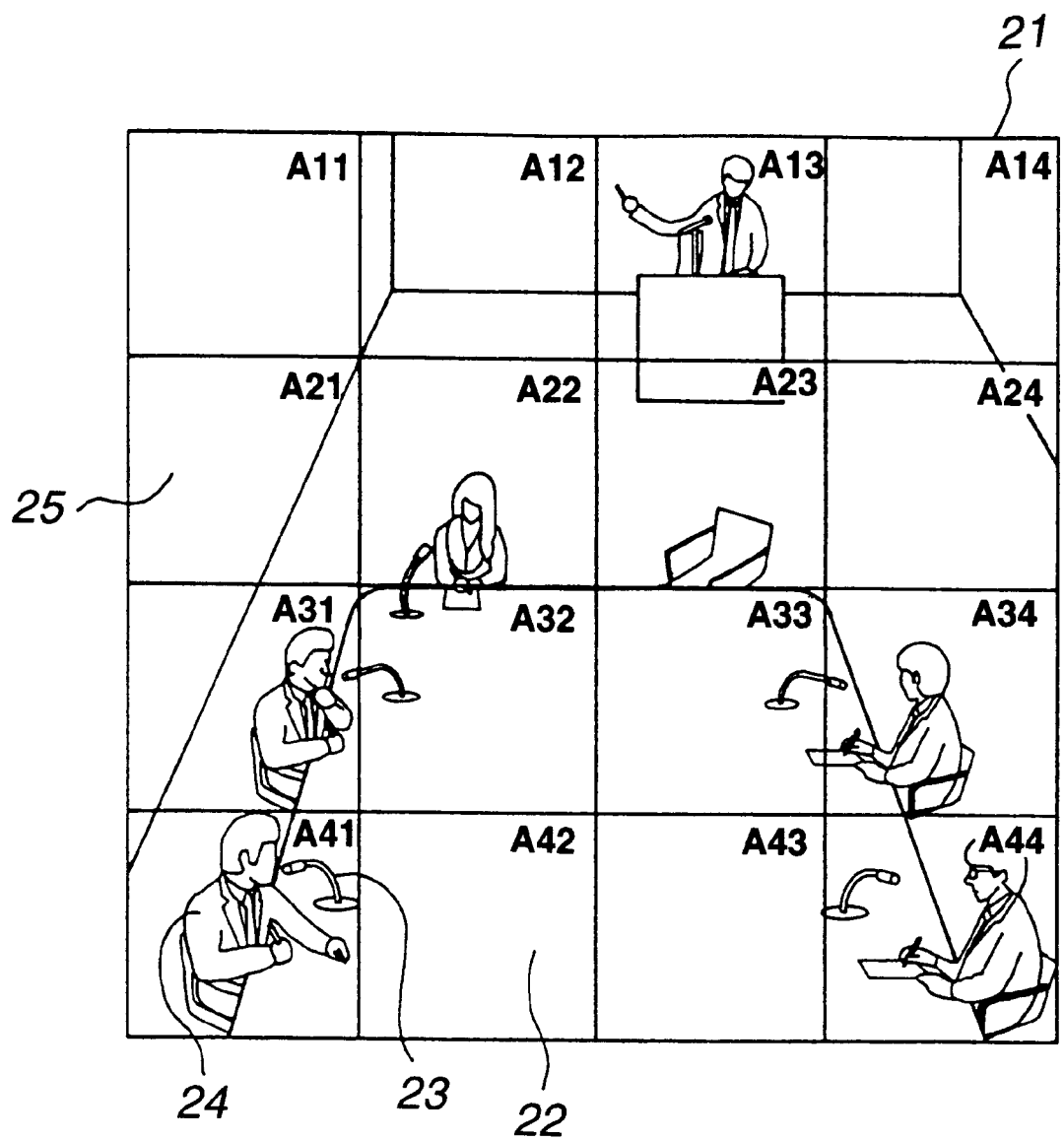
FIG. 2 is a diagram showing a scene of a TV conference appearing in a whole image area of a solid-state imaging device in the first embodiment.

FIGS. 1 and 2 show the first embodiment of the present invention. FIG. 1 is a block diagram showing the configurations of an imaging apparatus and display apparatus included in an imaging display system, and FIG. 2 is a diagram-showing a scene of a TV conference appearing in a whole image area of a solid-state imaging device.

The imaging apparatus comprises an X-Y addressing type solid-state imaging device 1 capable of outputting all the pixels in a whole image area or the pixels in the whole image area of which information is reduced in amount by thinning the pixels in the whole image at a given thinning ratio so as to extract specific pixels or outputting the pixels in a partial area within the whole image area; an imaging means 2 including the solid-state imaging device 1, optically forming a subject image, photoelectrically converting the formed subject image using the solid-state imaging device 1, and outputting a resultant electric signal; a motion detecting means 3 serving as a specifying means for specifying an area within the whole image area of the solid-state imaging device 1 which depicts motions; a block scan driving signal generating means 5 for generating a block scan driving signal used to control the solid-state imaging device 1 so as to output data of the pixels in consecutive partial areas (partial image areas) within the whole image area of the solid-state imaging device 1 which are specified by the motion detecting means 3; a thinning-out scan driving signal generating means 6 for generating a thinning-out scan driving signal used to control the solid-state imaging device 1 so as to output data of the pixels in the whole image area of which information is reduced in amount by thinning the pixels in the whole image area at a given thinning ratio so as to extract specific pixels; a driving signal switching means 7 for switching the block scan driving signal generating means 5 to the thinning-out scan driving signal generating means 6 or vice versa under the control of a system controller 10 that will be described later; and the system controller 10 for controlling the driving signal switching means 7.

The display apparatus includes a memory means 8 for receiving and temporarily storing a output of the solid-state imaging device 1 included in the imaging apparatus which is transmitted over, for example, a telephone line, and a display means 9 for successively reading and displaying pixel data stored in the memory means 8.

Thus, unlike the aforesaid prior art, no memory means is included in the imaging apparatus including the solid-state imaging device 1. The memory means 8 is included only in the display apparatus for receiving picture information transmitted from the imaging apparatus.

Next, the imaging display system will be described more particularly with reference to FIG. 2 by assuming that the structure of pixels in the whole image area of the solid-state imaging device 1 is an array of 2048 pixels lengthwise by 2048 pixels sideways.

FIG. 2 is a diagram showing a scene of a TV conference appearing in the whole image area of the solid-state imaging device 1.

In the whole image area 21, persons such as at 24 who are attendances, microphones such as at 23 placed in front of the persons 24, and a background including a table 22 and walls such as at 25 are depicted.

The whole image area 21 is divided into, for example, 16 partial image areas A11 to A44. Each of the partial image areas is formed with an array of 512 pixels lengthwise by 512 pixels sideways.

Among the partial image areas, the partial image areas A13, A22, A31, A34, A41, and A44 are areas in which the persons such as at 24 are depicted. As mentioned above, the microphones such as at 23 are placed in front of the persons 24. The microphones 23 placed in front of the persons 24 who are attendances are associated with the partial image areas A13, A22, A31, A34, A41, and A44 within the whole image area 21 of the solid-state imaging device 1.

An input unit of each of the microphones 23 includes a detecting circuit for detecting presence or absence of a voice input. When it is detected that a voice input is fed to a microphone 23, it is judged that a person in front of the microphone has spoken. The person is then regarded as an object of motion detection.

A criterion for detecting a voice input is that no cough, sneeze, and murmur should be contained, or in other words, that a voice of a certain level or higher continues for a given period of time or longer.

The motion detecting means 3 is thus configured. In this embodiment, the motion detecting means 3 is used as a specifying means for specifying a partial image area within the whole image area of the solid-state imaging device 1.

The block scan driving signal generating means 5 generates a block scan driving signal for triggering output of data of an array of 512 pixels lengthwise by 512 pixels sideways constituting a partial image ares within the whole image area 21 of the solid-state imaging device 1 which is specified by the motion detecting means 3.

By contrast, the thinning-out scan driving signal generating means 6 reads every fourth pixel both lengthwise and sideways, and generates a thinning-out scan driving signal for triggering output of data of pixels numbering a product of 512 lengthwise by 512 sideways which are extracted by thinning the pixels in the whole image area 21.

Next, the operation of the first embodiment will be described with reference to FIG. 1.

To begin with, at the time of system startup, a driving signal to be input to the driving signal switching means 7 is switched to an output of the thinning-out scan driving signal generating means 6 under the control of the system controller 10 or the like. Meanwhile, the thinning-out driving signal generating means 6 scans and thins the pixels in the whole image area 21, and outputs picture data that represents pixels numbering a product of 512 lengthwise by 512 sideways during one frame.

A thinning-out code used to judge whether or not data concerned is data acquired by performing a thinning-out scan is appended to the start of data output from the solid-state imaging device 1. As the thinning-out code, a code composed of 12 bits of all 1s and 12 bits of all 0s (111111111111000000000000) is used to be discriminated from a block code (12 bits lengthwise+12 bits sideways=24 bits indicating an address) that is address information used for a block scan.

Data to be transmitted during one frame is data consisting of a 24-bit block code and data of pixels numbering a product of 512 lengthwise by 512 sideways. The amount of the data is nearly the same as the amount of data representing the same number of pixels as the number of pixels to be sampled according to the generally-adopted NTSC system. The data can therefore be transmitted at a conventional rate.

Data output during the first one frame, which is transmitted from the imaging apparatus to the display apparatus and acquired according to thinning-out scan driving is stored in the memory means 8 according to a method of writing data of one pixel in a memory image area allocated to pixels numbering a product of 4 lengthwise by 4 sideways. This writing is repeated continuously for all pixels, whereby data items of pixels numbering a product of 512 lengthwise by 512 sideways are written in memory image areas allocated to pixels numbering a product of 2048 lengthwise by 2048 sideways.

The display means 9 reads data from the memory image areas allocated to the pixels numbering a product of 2048 lengthwise by 2048 sideways within the whole memory area of the memory means 8, and displays the data.

At the time of system startup, therefore, a thinning-out scan is performed first in order to output data during one frame. Thus, general information of a whole picture can be transmitted instantaneously.

After the first whole picture is displayed, the driving signal to be input to the driving signal switching means 7 is switched to an output of the block scan driving signal generating means 5 under the control of the system controller 10 or the like.

The motion detecting means 3 specifies a partial image area depicting motions within the whole image area on the basis of a voice input to a microphone 23.

The block scan driving signal generating means 5 generates a driving signal used to scan a block, that is, the partial image area specified by the motion detecting means 3.

A block code used to judge whether or not data concerned is data acquired by performing a block scan is appended to the start of data output from the solid-state imaging device 1 in response to the block scan driving signal. The resultant data shall be transmitted during one frame. The block code contains address information indicating an address at which read is started. The address is composed of a total of 24 bits including 12 bits lengthwise and 12 bits sideways. The 24 bits represents a number other than a number consisting of all 1s of 12 bits and all 0s of 12 bits and serving as the thinning-out code.

If a plurality of partial image areas depict motions, outputting data acquired by performing a block scan during one frame is repeated continuously in relation to the partial image areas.

The memory means 8 writes data of each partial image area, which depicts motions and is formed with an array of 512 pixels lengthwise by 512 pixels sideways, in a memory image area associated with the partial image area according to the address information contained in the block code appended to picture data.

The display means 9 reads data of an array of 2048 pixels lengthwise by 2048 pixels sideways from the whole memory area of the memory means 8 and displays a whole picture. At this time, if only one partial image area depicts motion, a corresponding picture is displayed in one frame during which data of the array of 512 pixels lengthwise by 512 pixels sideways forming the image area is transmitted.

If a plurality of partial image areas depict motion, either of two ways (1) and (2) of reading described below is adopted.

(1) Output data is rewritten frame by frame and read in order to display a corresponding picture.

(2) When all data items in the memory means 8 are rewritten with data items output by performing block scans, the resultant data is read in order to display a whole picture during a subsequent frame.

An area whose data is output from the solid-state imaging device 1 driven according to block scan driving and rewritten in the memory means 8 exhibits a resolution of 2048 scanning lines lengthwise and sideways (the actual number of pixels in a partial image area is a product of 512 lengthwise by 512 sideways). The resolution of the other image areas remains 512 scanning lines lengthwise and sideways which are defined by the first thinning-out read (the actual number of pixels in a partial image area is a product of 512 lengthwise by 512 sideways).

Data to be transmitted from the solid-state imaging device 1 to the memory means 8 during one frame represents an array of of 512 pixels lengthwise by 512 pixels sideways, and can therefore be processed at a standard rate conformable to the NTSC system. As long as the NTSC-conformable rate is adopted, a special transmission system different from a known one is unnecessary to transmit data from the solid-state imaging device 1 to the memory means 8 during one frame. For example, a combination of an existing modem and telephone line can be used. Data can be transmitted to a remote place relatively readily.

The thinning-out scan driving signal generating means is used at the time of startup, and the block scan driving signal generating means is used when motions are made. Since the thinning-out scan driving signal generating means and block scan driving signal generating means are thus used in different situations, an optimal picture can be produced in either of the situations by outputting data of a certain small number of pixels.

Moreover, when many partial image areas depict motion, the thinning-out scan driving signal generating means may be used. When few partial image areas depict motion, the block scan driving signal generating means may be used.

According to the first embodiment, unlike the prior art, since the imaging apparatus need not include a memory means, the imaging apparatus can be designed compactly at lower cost.

Moreover, data of only pixels in a partial image area depicting motion should be read from the imaging means including the solid-state imaging device that is randomly accessible when motions are made. Since it is unnecessary to read data from unwanted parts, reading can be achieved for a short period of time. This leads to fast processing.

When no motion is made, it is unnecessary to output data of pixels to the memory means in the display apparatus. A total amount of information to be transmitted from the solid-state imaging device to the memory means can be reduced markedly.

Since the thinning-out scan driving signal generating means thins pixels in the whole image area and outputs resultant data, general information of the whole picture can be transmitted instantaneously.

In addition, the number of pixels whose data is transmitted during one frame and for which a block scan is driven by the block scan driving signal generating means and the number of pixels whose data is transmitted during one frame and for which a thinning-out scan is driven by the thinning-out scan driving signal generating means can be set to any values. By setting the numbers of pixels to the same value, a frame rate at which data of pixels is output from the solid-state imaging device can be held constant. In this case, an output of pixels scanned in response to the block scan driving signal and an output of pixels scanned in response to the thinning-out scan driving signal can be transmitted by a common transmitting means.

Moreover, since the number of pixels whose data is transmitted during one frame can be set to a value sufficiently smaller than a total number of pixels, even when a solid-state imaging device enjoying a high density of pixels is employed, if the number of pixels is suppressed to the same level as the number of pixels treated by, for example, an NTSC-conformable equipment, a known transmitting means capable of transmitting only a relatively small amount of information can be utilized.

Furthermore, since the driving signal switching means is operated independently of control given to the motion detecting means, a frame rate can be set to any value.

Next, the second embodiment of the present invention will be described. The description of components in the second embodiment identical to those in the first embodiment will be omitted. A difference alone will be described mainly.

The second embodiment will be described with reference to FIG. 1.

In the first embodiment, an output of the motion detecting means 3 is input to the block scan driving signal generating means 5 alone. The system controller 10 controls the driving signal switching means 7 independently of the output so as to switch driving signals.

By contrast, in the second embodiment, as indicated with a dashed line in FIG. 1, an output of the motion detecting means 3 is input to the system controller 10. Based on the output of the motion detecting means 3, the system controller 10 can switch connections of the driving signal switching means 7.

The second embodiment can exert nearly the same effect as the first embodiment. Besides, since the system controller operates the driving signal switching means on the basis of an output of the motion detecting means, switching driving signals can be automated. Moreover, since the switching is based on the output of the motion detecting means, the switching is carried out properly. This leads to fast processing.

Figure 3:
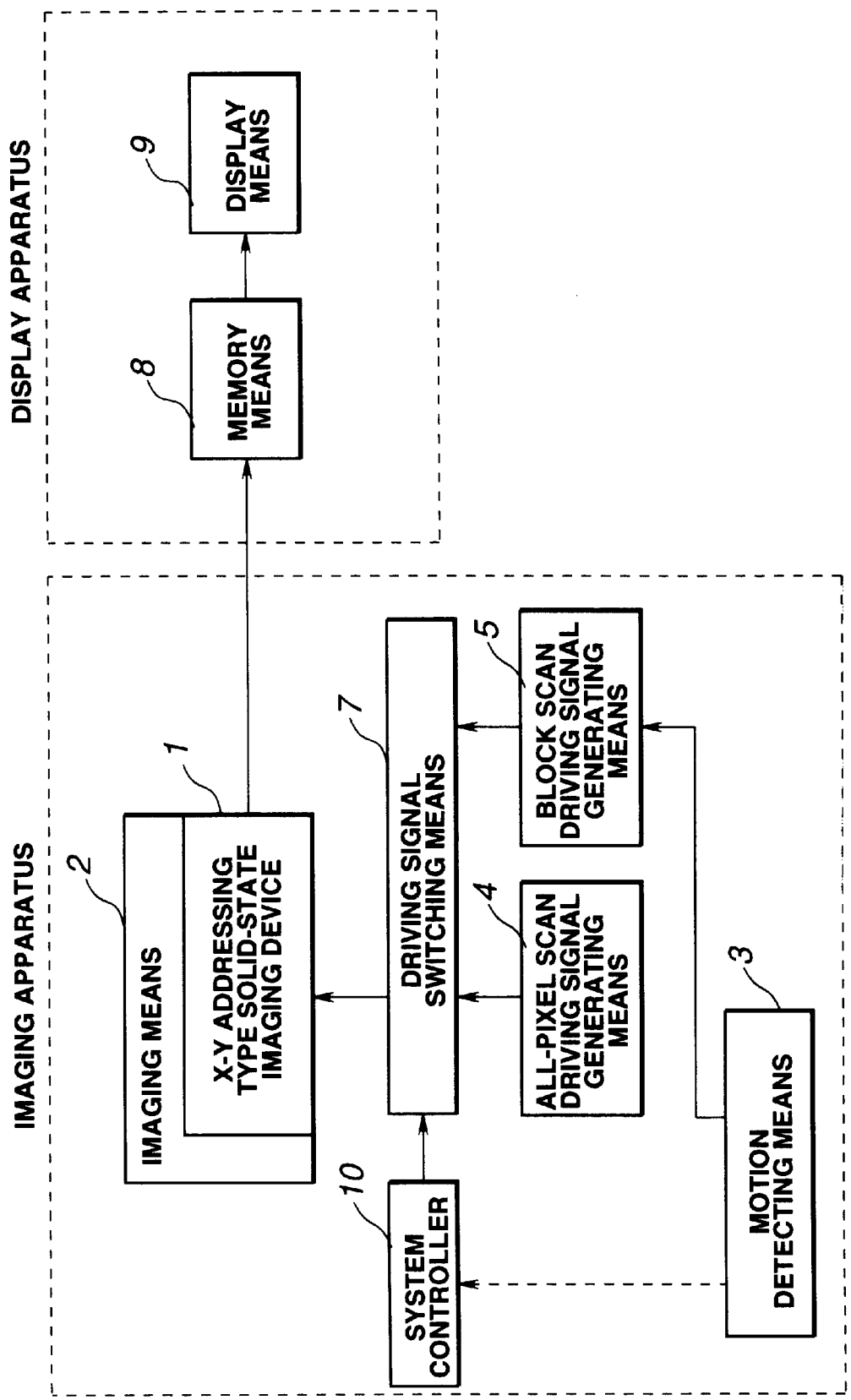
FIG. 3 is a block diagram showing the configurations of an imaging apparatus and display apparatus included in an imaging display system of the third or fourth embodiment of the present invention.

FIG. 3 is a block diagram showing the configurations of an imaging apparatus and display apparatus included in an imaging display system of the third embodiment of the present invention. The description of components in the third embodiment identical to those in the first and second embodiments will be omitted. A difference alone will be described mainly.

In the third embodiment, the thinning-out scan driving signal generating means 6 included in the first embodiment is excluded. Instead of the means, an all-pixel scan driving signal generating means 4 is included for generating a driving signal used to output data of all pixels in the image area of the solid-state imaging device 1.

Next, the operation of the third embodiment will be described.

To begin with, at the time of system startup, the driving signal to be input to the driving signal switching means 7 is switched to an output of the all-pixel scan driving signal generating means 4. The all-pixel scan driving signal generating means 4 generates a driving signal used to output picture data of an array of 2048 pixels lengthwise by 2048 pixels sideways, which forms the whole image area of the solid-state imaging device 1, during one frame.

An all-pixel code used to identify data acquired by scanning all pixels is appended to data output from the solid-state imaging device. As the all-pixel code, a code consisting of 24 bits of all 1s (111111111111111111111111) is used to be discriminated from the block code providing address information which is appended to data acquired by performing a block scan.

When the data transmitted from the imaging apparatus is input to the display apparatus, the memory means 8 writes data of an array of 2048 pixels lengthwise by 2048 pixels sideways in memory areas successively. The display means 9 reads data from the memory areas associated with the array of 2048 pixels lengthwise by 2048 pixels sideways within the whole memory area of the memory means 8, and displays a corresponding whole picture.

After the first whole picture is displayed, the driving signal to be input to the driving signal switching means 7 is switched to an output of the block scan driving signal generating means 5 under the control of the system controller 10 or the like.

Thereafter, like the first embodiment, block scan driving is carried out to scan a partial image area depicting motions. According to an address contained in a block code, an associated memory area in the memory means 8 is rewritten with data of pixels in the partial image area. A corresponding picture is then displayed on the display means 9.

The third embodiment can exert nearly the same effect as the first embodiment. Unlike the prior arts, a memory means need not be included in the imaging apparatus. The imaging apparatus can therefore be designed compactly at lower cost.

Moreover, data of pixels in a partial image area depicting motions should merely be read from the imaging means including the solid-state imaging device, which is accessible at random, when motions are made. It is therefore unnecessary to read data from unwanted parts. Reading can therefore be achieved in a short period of time. This leads to fast processing.

Furthermore, when no motion is made, it is unnecessary to output data of pixels to the memory means in the display apparatus. A total amount of information to be transmitted from the solid-state imaging device to the memory means can be reduced markedly.

Since the driving signal switching means is operated independently of control given to the motion detecting means, a frame rate can be set to any value.

Next, the fourth embodiment of the present invention will be described. The description of components in the fourth embodiment identical to those in the first to third embodiments will be omitted. A difference alone will be described mainly.

The fourth embodiment will be described with reference to FIG. 3.

In the third embodiment, an output of the motion detecting means 3 is input to the block scan driving signal generating means 5 alone. The system controller 10 controls the driving signal switching means 7 independently of the output so as to switch driving signals.

By contrast, in the fourth embodiment, as indicated with a dashed line in FIG. 3, an output of the motion detecting means 3 is input to the system controller 10. Based on the output of the motion detecting means 3, the system controller 10 switches connections of the driving signal switching means 7.

The fourth embodiment exerts nearly the same effect as the third embodiment. Besides, since the system controller operates the driving signal switching means on the basis of the output of the motion detecting means, switching driving signals can be automated. Moreover, since the switching is based on the output of the motion detecting means, the switching is carried out properly. This leads to fast processing.

Figure 4:
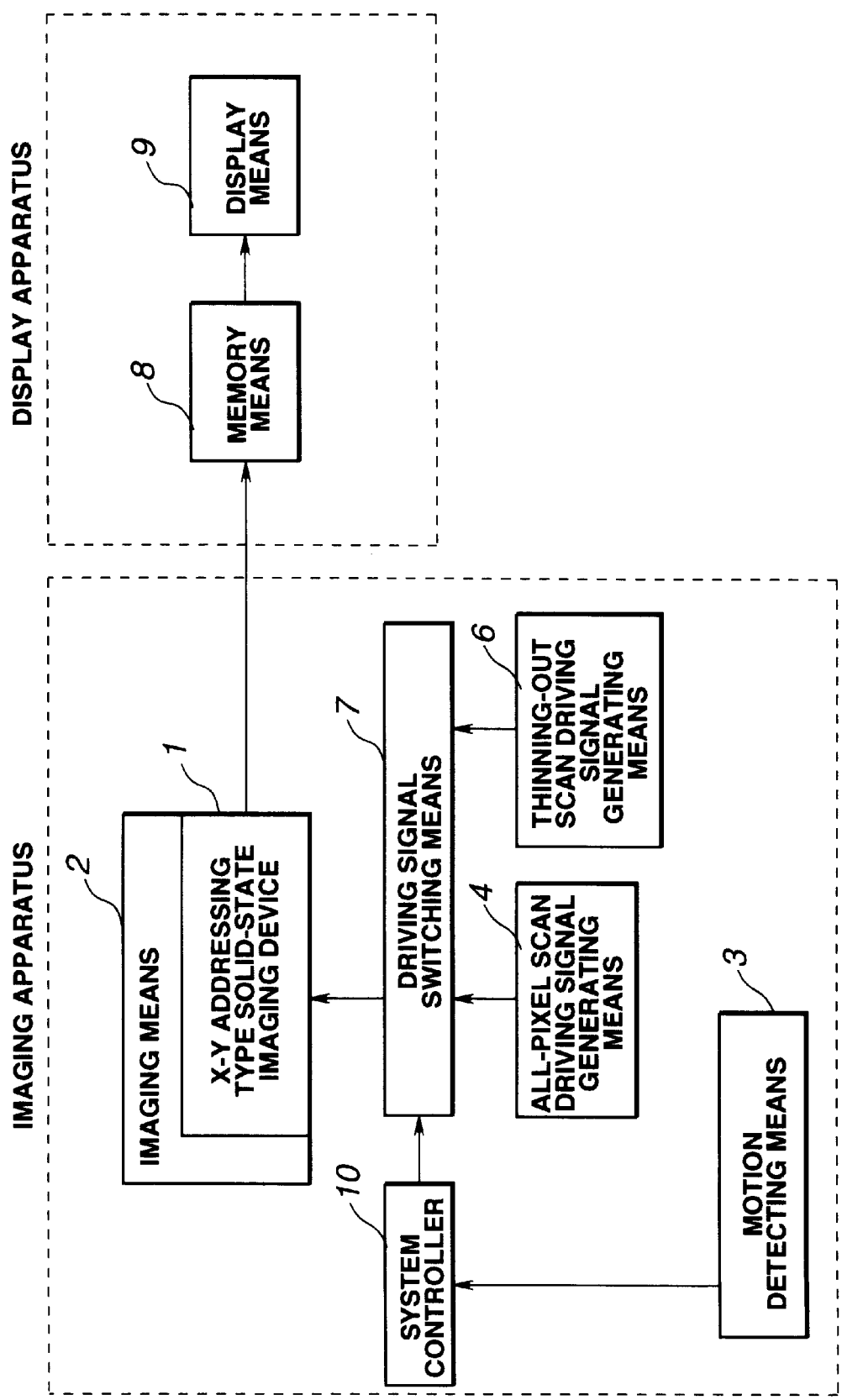
FIG. 4 is a block diagram showing the configurations of an imaging apparatus and display apparatus included in an imaging display system of the fifth embodiment of the present invention.

FIG. 4 is a block diagram showing the configurations of an imaging apparatus and display apparatus included in an imaging display system of the fifth embodiment of the present invention. The description of components in the fifth embodiment identical to those in the first to fourth embodiments will be omitted. A difference alone will be described mainly.

In the fifth embodiment, the block scan driving signal generating means 5 included in the first embodiment is excluded. Instead of the means 5, an all-pixel scan driving signal generating means 4 is included for generating a driving signal used to output data of all pixels in the image area of the solid-state imaging device 1.

Moreover, an output of the motion detecting means 3 is input to the system controller 10. Based on the output, the driving signal switching means 7 arbitrarily switches the all-pixel scan driving signal generating means 4 to the thinning-out scan driving signal generating means 6 or vice versa under the control of the system controller 10.

Moreover, the operations of the all-pixel scan driving signal generating means 4 are identical to those in the third embodiment, and the operations of the thinning-out scan driving signal generating means 6 are identical to those in the first embodiment.

Next, the operation of the fifth embodiment will be described.

In the fifth embodiment, when motions made by a subject to be imaged are detected by the motion detecting means 3, an output of the motion detecting means is input to the system controller 10. The system controller 10 switches the driving signal to be input to the driving signal switching means 7 to an output of the all-pixel scan driving signal generating means 4 or thinning-out scan driving signal generating means 6.

According to a state in which a subject to be imaged sits still or in motion, an optimal frame rate can be specified.

For example, when it is judged from an output of the motion detecting means 3 that a subject makes no motion or few motions, the system controller 10 switches the driving signal to be input to the driving signal switching means 7 to an output of the all-pixel scan driving signal generating means 4, and thus specifies a frame rate realizing an improved resolution.

By contrast, when it is judged from the output of the motion detecting means 3 that a subject makes motions or many motions, the system controller 10 switches the driving signal to be input to the driving signal switching means 7 into an output of the thinning-out scan driving signal generating means 6, and thus specifies a frame rate realizing a smooth motion picture.

The fifth embodiment can exert nearly the same effect as the first to fourth embodiments. Besides, since the system controller operates the driving signal switching means on the basis of an output of the motion detecting means, switching driving signals can be automated. Moreover, since the switching is based on the output of the motion detecting means, it can be carried out properly. This leads to fast processing.

Moreover, a frame rate can be set to any value. According to whether, for example, a subject makes motions or not, or makes many motions or few motions, an optimal frame rate can be set.

Figure 5:
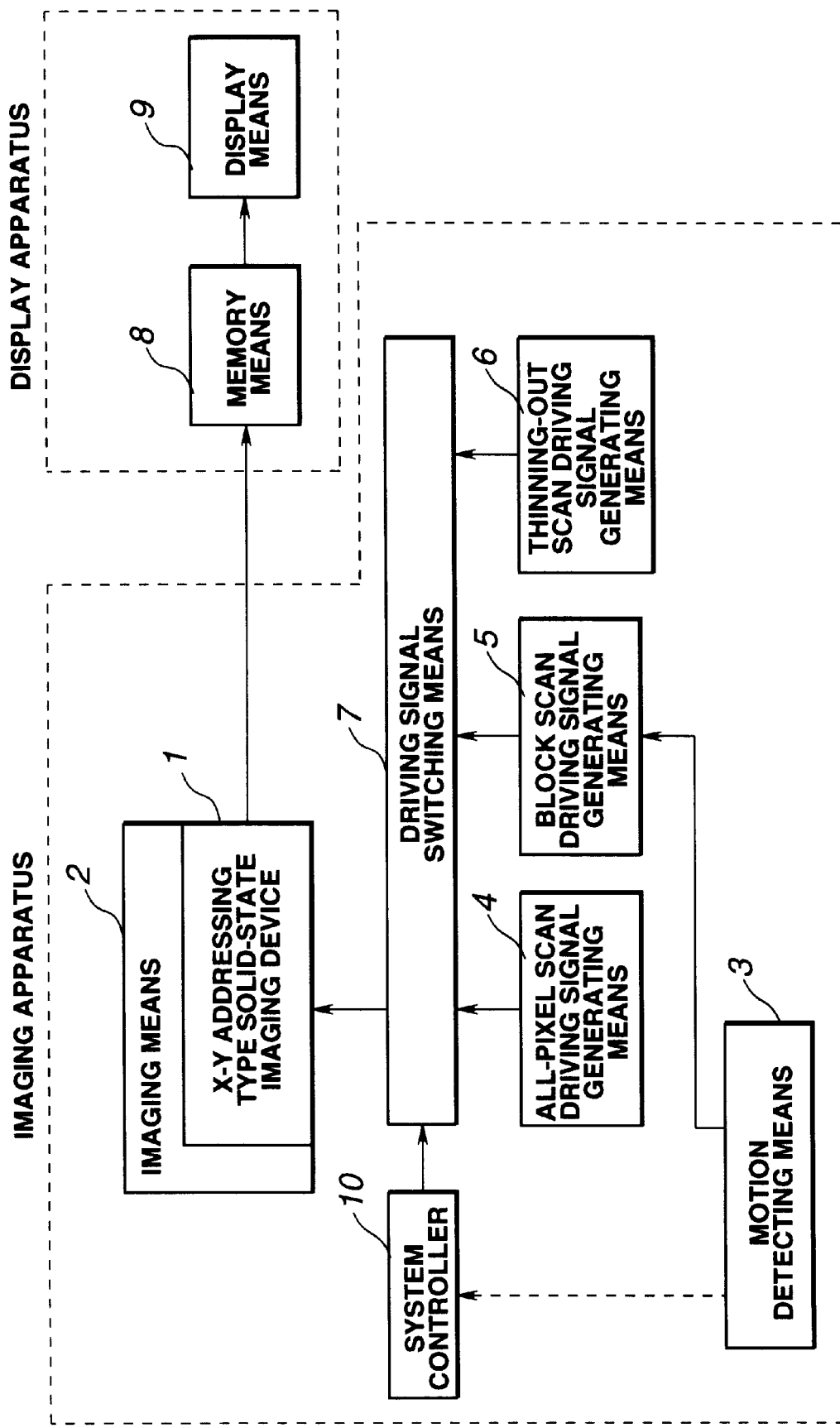
FIG. 5 is a block diagram showing the configurations of an imaging apparatus and display apparatus included in an imaging display system of the sixth or seventh embodiment of the present invention.

FIG. 5 is a block diagram showing the configurations of an imaging apparatus and display apparatus included in an imaging display system of the sixth embodiment of the present invention. The description of components in the sixth embodiment identical to those in the first to fifth embodiments will be omitted. A difference alone will be described mainly.

The sixth embodiment includes, in addition to the same components as the first embodiment, an all-pixel scan driving signal generating means 4 for generating a driving signal used to output data of all pixels in the image area of the solid-state imaging device 1.

Moreover, the operations of the all-pixel scan driving signal generating means 4 and block scan driving signal generating means 5 are identical to those in the third embodiment. The operations of the thinning-out scan driving signal generating means 6 are identical to those in the first embodiment.

Next, the operation of the sixth embodiment will be described.

When the system is started up or a subject makes no motion, the driving signal to be input to the driving signal switching means 7 is switched to an output of the all-pixel scan driving signal generating means 4. Thereby, information of the whole image area 21 can be transmitted at a time, and a frame rate realizing an improved resolution can be specified.

When an operator judges that a small number of areas depict motions, if an instruction is entered at an operation unit that is not shown, the system controller 10 switches the driving signal to be input to the driving signal switching means 7 into an output of the block scan driving signal generating means 5. This makes it possible to set a frame rate realizing an improved resolution and smooth motion picture.

By contrast, when many areas depict motions, as far as the configuration of the third embodiment including only the all-pixel scan driving signal generating means 4 and block scan driving signal generating means 5 is concerned, since data of pixels stored in areas in the memory means 8 which associate with the areas depicting motions is entirely updated, a plurality of frames are required.

In contrast in the sixth embodiment, when an operator judges that many areas depict motions, if an instruction is entered at the operation unit that is not shown, the system controller 10 switches the driving signal to be input to the driving signal switching means 7 to an output of the thinning-out scan driving signal generating means 6. Thereby, data of extracted pixels can be output and transmitted to the memory means 8 at a low frame rate. Besides, a picture corresponding to the whole image area 21 can be displayed by the display means 9.

Whether many areas or few areas depict motions, an optimal image can be displayed. Data of pixels scanned using the outputs of the block scan driving signal generating means 5 and thinning-out scan driving signal generating means 6 can be output at a low frame rate, for example, a standard NTSC-conformable rate. From this viewpoint, the same effect as that of the first embodiment can be exerted.

The sixth embodiment can exert nearly the same effects as the aforesaid embodiments. Besides, since the driving signal switching means is operated independently of control given to the motion detecting means, a frame rate can be set to any value. For example, when no motion is made, the driving signal switching means can be switched over to the all-pixel scan driving signal generating means. A frame rate realizing an improved resolution can be specified. When data of all pixels scanned in response to the all-pixel scan driving signal is output at the time of system startup, information of the whole image area can be transmitted at a time.

Moreover, when many areas depict motions, the driving signal switching means is switched over to the thinning-out scan driving signal generating means. Thereby, a frame rate realizing a smooth motion picture can be specified.

Furthermore, when few areas depict motions, the driving signal switching means is switched over to the block scan driving signal generating means so that data of only pixels in areas depicting motions can be output. Thereby, a smooth motion picture can be produced at a relatively low frame rate of the same level attained when data of pixels scanned in response to the thinning-out scan driving signal is output.

Next, the seventh embodiment of the present invention will be described. The description of components in the seventh embodiment identical to those in the first to sixth embodiments will be omitted. A difference alone will be described mainly.

The seventh embodiment will be described with reference to FIG. 5.

In the sixth embodiment, an output of the motion detecting means 3 is input only to the block scan driving signal generating means 5. The system controller 10 controls the driving signal switching means 7 independently of the output so as to switch driving signals.

By contrast, in the seventh embodiment, as indicated with a dashed line in FIG. 5, the output of the motion detecting means 3 is input to the system controller 10. The system controller 10 switches connections of the driving signal switching means 7 on the basis of the output of the motion detecting means 3.

In this embodiment, when one or two of the sixteen partial image areas shown in FIG. 2 depict motions, the system controller 10 judges that few motions are made. When three or more of the sixteen partial image areas depict motions, the system controller 10 judges that many motions are made.

The seventh embodiment can exert nearly the same effect as the sixth embodiment. Besides, since the system controller operates the driving signal switching means on the basis of an output of the motion detecting means, switching driving signals can be automated. Moreover, since the switching is based on the output of the motion detecting means, it can be achieved properly. This leads to fast processing.

Figure 6:
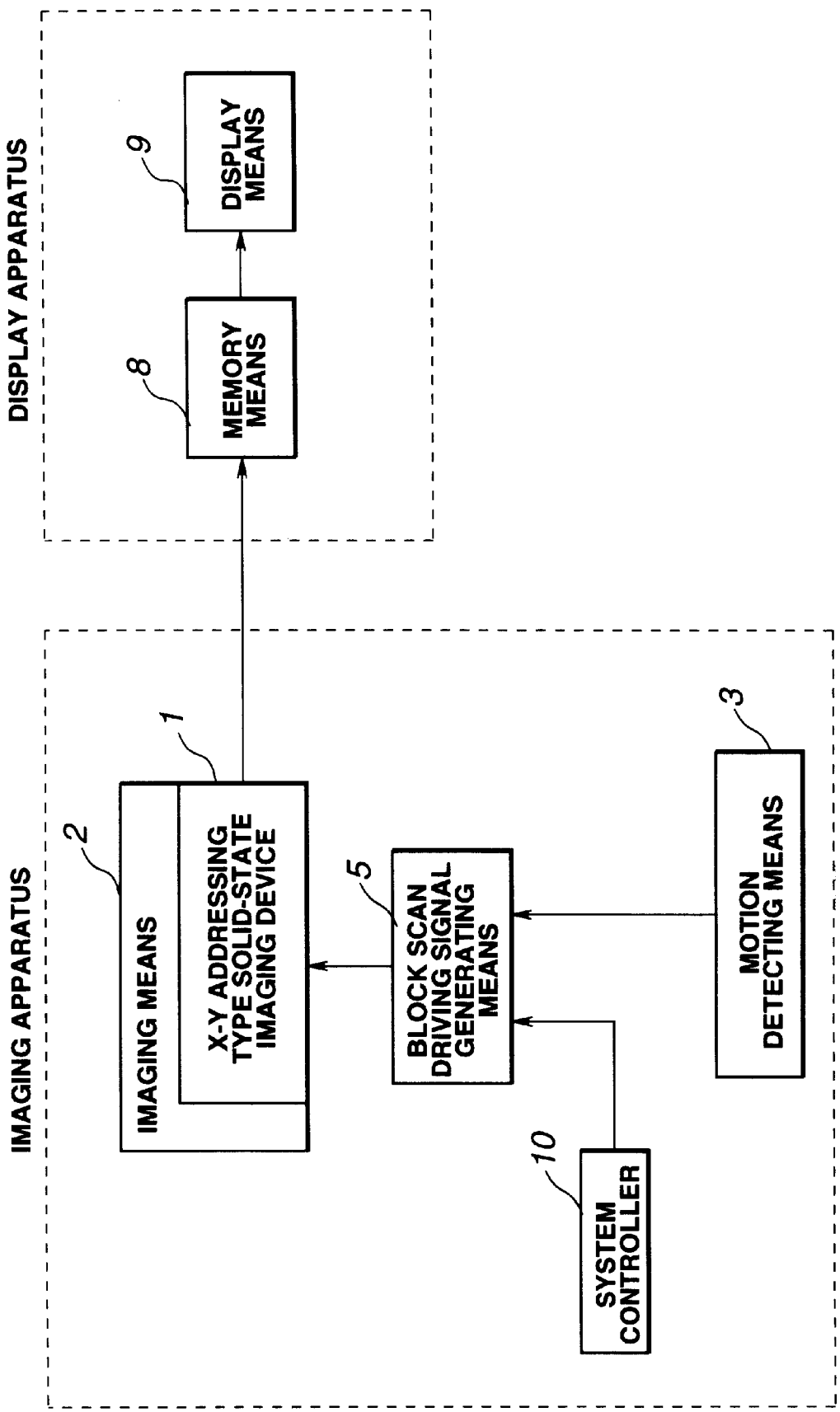
FIG. 6 is a block diagram showing the configurations of an imaging apparatus and display apparatus included in an imaging display system of the eighth embodiment of the present invention.

FIG. 6 is a block diagram showing the configurations of an imaging apparatus and display apparatus included in an imaging display system of the eighth embodiment of the present invention. The description of components in the eighth embodiment identical to those in the first to seventh embodiments will be omitted. A difference alone will be described mainly.

In the eighth embodiment, an output of the motion detecting means 3 is input to the block scan driving signal generating means 5. Besides, the system controller 10 can give control. In other words, the block scan driving signal generating means 5 controls the solid-state imaging device 1 according to at least one of a control given by the system controller 10 and the output of the motion detecting means 3 so that the solid-state imaging device 1 outputs data of pixels in a specified partial image area within the whole image area 21 of the solid-state imaging device 1.

Next, the operation of the eighth embodiment will be described.

At the time of system startup, outputting data of pixels in partial image areas within the whole image area 21 is repeated a plurality of times while the locations of the pixels to be read are changed. Finally, data of all pixels within the whole image area 21 is output. A block code used to judge whether or not data is acquired by performing a block scan is appended to the start of the output data.

The memory means 8 writes data of an array of 2048 pixels lengthwise by 2048 pixels sideways successively in memory areas according to an address contained in the block code. The display means 9 reads the data of the array of 2048 pixels lengthwise by 2048 pixels sideways from the whole memory area of the memory means 9 and displays a corresponding whole picture.

Next, a partial image area depicting motions, which is specified by the motion detecting means 3, is scanned as a block by the block scan driving signal generating means 5 and resultant data is output during one frame. The operations of the block scan driving signal generating means 5 are identical to those in the first embodiment.

Reading partial image areas successively at the time of system startup and reading a partial image area specified by the motion detecting means 3 can be switched arbitrarily under the control of the system controller 10 or the like.

The eighth embodiment can exert nearly the same effects as the aforesaid embodiments. Besides, since both data of pixels in the whole image area and data of pixels in an area depicting motions can be output, another driving signal generating means and driving signal switching means are unnecessary. The configuration and operations in the eighth embodiment are therefore simpler than those in the aforesaid embodiments. Consequently, the imaging apparatus can be designed compactly at lower cost.

Next, the ninth embodiment of the present invention will be described. The description of components in the ninth embodiment identical to those in the first to eighth embodiments will be omitted. A difference alone will be described mainly.

In the ninth embodiment, a designating means is included for making it possible to designate areas to be used within the whole image area 21. The designating means is formed with an operation unit that is not shown or the motion detecting means. Owing to the designating means, a range of areas depicting motions to be specified by the motion detecting means 3 shown in FIG. 1 can be narrowed.

This constituent feature will be described with reference to FIG. 2.

As mentioned above, among the partial image areas A11 to A44 that are 16 divisions of the whole image area 21, areas depicting persons as at 24 or attendances, that is, areas depicting motions are 6 areas A13, A22, A31, A34, A41, and A44.

By limiting areas, of which data is output, to the six partial image areas, the operating time of at least one of the solid-state imaging device 1 and motion detecting means 3 required for outputting data of pixels in the whole image area 21 can be shortened. In the example shown in FIG. 2, the operating time is simply calculated to or shortened to six-sixteenths ($6/16$).

Pixels in areas of which data is not output may be compensated for by utilizing data of pixels output previously from the solid-state imaging device 1. Alternatively, data of a natural image or computer graphics which is stored in advance in another memory means such as a ROM may be read and written in the memory means 8 for use. A natural image can therefore be seen without the presence of a missing part in the whole image area visualized by the display means 9.

The ninth embodiment can exert nearly the same effects as the first to eighth embodiments. Besides, since areas within the whole image area, of which data is output, are limited, the operating time of the solid-state imaging device or motion detecting means can be shortened.

Subsequently, the tenth embodiment of the present invention will be described. The description of components in the tenth embodiment identical to those in the first to ninth embodiments will be omitted. A difference alone will be described mainly.

In the tenth embodiment, an operation unit is included as a specifying means on behalf of the motion detecting means 3 shown in FIG. 1. Owing to the operation unit, data of pixels on which an operator's will is reflected can be output.

Specifically, for example, when a TV conference like the one shown in FIG. 2 is held, if a chairperson selects a person who should be permitted to speak or whose opinion is needed, data of pixels in a partial image area associated with the person within the whole image area 21 is output and a corresponding picture is displayed as a motion picture on the display means 9. Thus, the chairperson's will can be reflected clearly on visualization. This constituent feature can serve as a means for helping the chairperson proceed with the conference.

The tenth embodiment can exert nearly the same effects as the first to ninth embodiments. Besides, since an operator's will is reflected on visualization, information to be transmitted can meet a request more satisfactorily. When the imaging display system is adapted for, for example, a TV conference, the constituent feature can serve as a means for helping a chairperson proceed with the conference.

Figure 7:
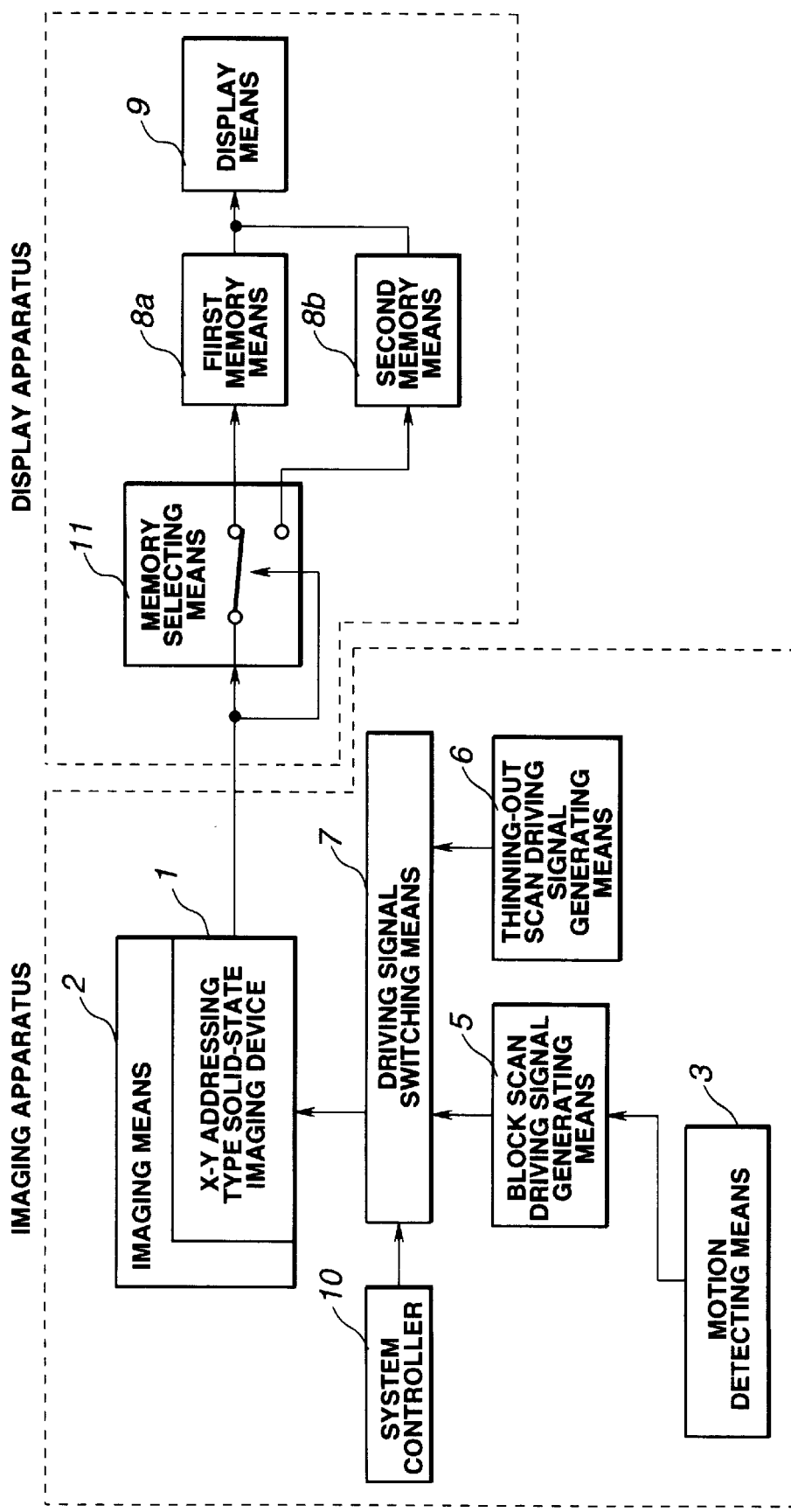
FIG. 7 is a block diagram showing the configurations of an imaging apparatus and display apparatus included in an imaging display system of the eleventh embodiment of the present invention.

FIG. 7 is a block diagram showing the configurations of an imaging apparatus and display apparatus included in an imaging display system of the eleventh embodiment of the present invention. The description of components in the eleventh embodiment identical to those in the first to tenth embodiments will be omitted. A difference alone will be described mainly.

The eleventh embodiment is a slight variation of the first embodiment. FIG. 7 shows part of the configuration of this embodiment.

The display apparatus included in the imaging display system of this embodiment comprises a memory selecting means 11 for receiving an output of the solid-state imaging device 1 transmitted by utilizing, for example, a telephone line, and arbitrarily selecting any of memory means that will be described later according to a block code or thinning-out code contained in the output; a first memory means 8a serving as a thinning-out memory means for temporarily storing an output of the memory selecting means 11 through one output terminal thereof; a second memory means 8a serving as a block memory means for temporarily storing an output of the memory selecting means 11 through the other output terminal thereof; and a display means 9 for successively reading and displaying data of pixels stored in the first memory means 8a or second memory means 8b.

Next, the operation of the eleventh embodiment will be described.

When output data provided in response to an output of the block scan driving signal generating means 5 is received, the memory selecting means 11 is switched over to the other output terminal according to a block code contained in the output data, and pixel data is stored in the second memory means 8b. By contrast, when an output is provided in response to an output of the thinning-out scan driving signal generating means 5, the memory selecting means 11 is switched over to one terminal thereof in order to store pixel data in the first memory means 8a. The data is then read and a corresponding whole picture is displayed by the display means 9.

The eleventh embodiment can exert nearly the same effects as the aforesaid embodiments. Besides, by aribitrarily switching connections of the memory selecting means, data of a plurality of groups of pixels output from the solid-state imaging device according to a plurality of driving signals can be stored in different memory means. By controlling reading of the memory means, a picture to be displayed on the display means can be set arbitrarily to either a picture having an improved resolution or a smooth motion picture.

Moreover, when data of pixels in the whole image area is output a plurality of times by performing block scans, since data sent during one frame is part of data of the whole image area, several frames are needed for sending all data items. Meanwhile, therefore, a picture represented by pixel data acquired by performing a thinning-out scan and stored in the first memory means is displayed on the display means. After all split pixel data items acquired by performing block scans are sent to the second memory means, the memory selecting means is switched over to the second memory means. This makes it possible not to display a picture being rewritten.

When an area depicting motions is not limited to specific partial image areas but a motion in a certain area shifts to another area, the foregoing constituent feature enables display of a naturally-seen motion picture on the display means. In other words, when a picture produced by performing block scans is on display, if a person moves to a place associated with another partial image area, a natural motion picture can be displayed by changing the block scan mode to the thinning-out scan mode and reading data from the memory means storing data acquired by performing a thinning-out scan.

In the above description, the X-Y addressing solid-state imaging device should preferably be a MOS internal amplification sensor.

The eleventh embodiment has the configuration that is a slight modification of the configuration of the first embodiment. That is to say, pixel data acquired by performing block scans is stored in the second memory means 8b, and pixel data acquired by performing a thinning-out scan is stored in the first memory means 8a. Alternatively, the configuration of another embodiment may be modified, wherein, for example, an all-pixel memory means for storing pixel data acquired by performing an all-pixel scan is included and the memory selecting means is used to select the all-pixel memory means.

In the aforesaid embodiments, for example, a motion detecting means that will be described below may be adopted.

To be more specific, a memory means capable of storing data of all pixels is included in the imaging apparatus, and data in the memory means is updated frame by frame. Motions can be detected by comparing data of each pixel in each partial image area with data acquired during an immediately preceding frame.

Even in this case, if a solid-state imaging device that is randomly accessible is adopted, an output of pixels will not be wasted. The aforesaid constituent feature of fast read can be provided. Moreover, when thinning-out read or block read is carried out, as mentioned above, an existing NTSC-conformable equipment adopting a certain relatively low frame rate can be used to transmit data.

Figure 8:
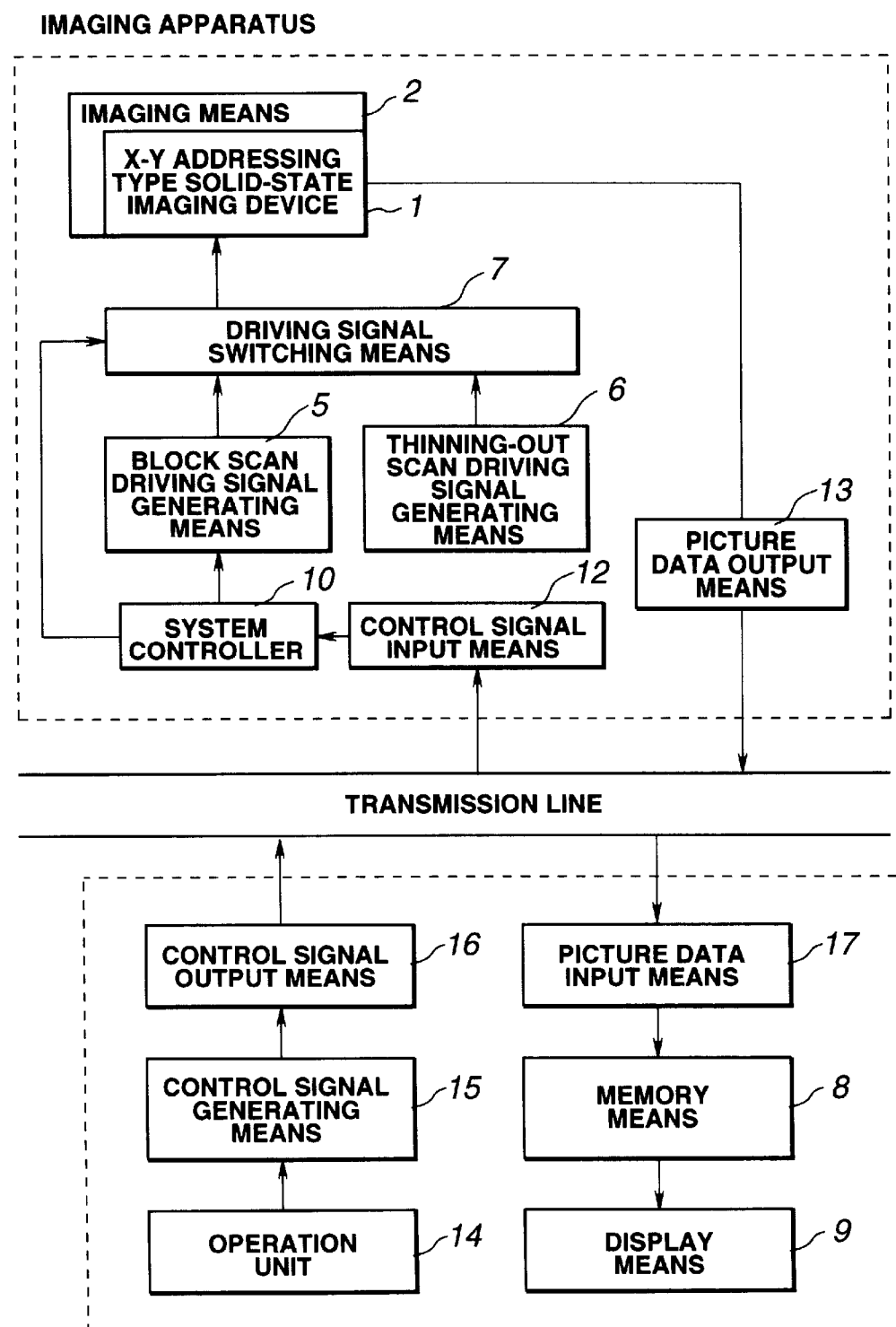
FIG. 8 is a block diagram showing the configurations of an imaging apparatus and display apparatus included in an imaging display system of the twelfth embodiment of the present invention.

FIG. 8 is a block diagram showing the configurations of an imaging apparatus and display apparatus included in an imaging display system of the twelfth embodiment of the present invention. The description of components in the twelfth embodiment identical to those in the first embodiment will be omitted. A difference alone will be mainly described.

In the aforesaid embodiments, picture data to be transmitted is determined by the imaging apparatus. In the twelfth embodiment, the imaging apparatus transmits picture data according to how the display apparatus is handled.

The imaging apparatus further includes a control signal input means 12 for inputting a control signal output from the display apparatus that will be described later, and a picture data output means 13 for outputting picture data output from the solid-state imaging device 1 to the display apparatus.

The display apparatus further includes an operation unit 14 to be handled to select whether a whole picture is displayed by carrying out thinning-out read or a portion of the whole picture which is wanted to be seen in enlargement is designated and an associated partial image area is visualized by carrying out block reading a control signal generating means 15 for generating a control signal used for carrying out thinning-out reading or block reading, such as, address information used for carrying out block reading according to how the operation unit 14 is handled; a control signal output means 16 for outputting the control signal to the imaging apparatus; and a picture data input means 17 for inputting picture data output from the imaging apparatus.

As a transmission line for linking the imaging apparatus and display apparatus, an existing transmitting means such as a telephone line or LAN can be used in the same manner as that in the aforesaid embodiments. Moreover, a charge modulation device (CMD) type imaging device may be used as the solid-state imaging device.

Referring to FIG. 8, the operation of the twelfth embodiment will be described.

To begin with, at the time of system startup, picture data acquired by carrying out thinning-out reading using the imaging apparatus during one frame is transmitted to the display apparatus. The display apparatus displays a whole picture in the form of a motion picture.

When an operator wants to see a portion of the whole picture in enlargement, the operator designates the portion he/she wants to see at the operation unit 14 included in the display apparatus according to a handling procedure that will be described later. The control signal generating means 15 generates a control signal according to address information used for reading a block designated at the operation unit 14. The control signal is output from the display apparatus via the control signal output means 16, and input to the control signal input means 12 in the imaging apparatus over a transmission line such as a telephone line.

The input control signal is input to the system controller 10. The system controller 10 outputs designated address information to the block scan driving signal generating means 5, and controls the driving signal switching means 7 so as to switch the driving signal to be input to the driving signal switching means to an output of the block scan driving signal generating means 5.

The block scan driving signal generating means 5 generates a driving signal used to scan a block, that is, a partial image area according to the address information. A block code containing address information of an address at which reading is started is appended to the start of picture data output from the solid-state imaging device 1 in response to the block scan driving signal in the same manner as that in the first embodiment. The picture data output from the solid-state imaging device 1 is output from the imaging apparatus via the picture data output means 13, and input to the picture data input means 17 in the imaging apparatus over a transmission line.

The input picture data is, like that in the first embodiment, stored in the memory means 8, and then read from the memory means 8 to be visualized by the display means 9. Data of the designated partial image area is read from the solid-state imaging device 1 and visualized in the form of a motion picture.

According to the twelfth embodiment, reading of data from the solid-state imaging device in the imaging apparatus can be controlled by handling the display apparatus. An operator can therefore produce a desired picture by handling the display apparatus.

Moreover, since a memory means need not be included in the imaging apparatus, the imaging apparatus can be designed compactly at lower cost.

Furthermore, data of only the pixels in a partial image area designated at the operation unit should be read from the imaging means including the solid-state imaging device that is randomly accessible, when they are needed. It is therefore unnecessary to read unwanted parts. Reading can therefore be achieved for a short period of time. This leads to fast processing.

In addition, the number of pixels scanned in response to an output of the block scan driving signal generating means during one frame, and the number of pixels scanned in response to an output of the thinning-out scan driving signal generating means during one frame can be set to any values. When the numbers of pixels are set to the same value, a frame rate at which pixels are output from the solid-state imaging device can be kept constant. In this case, an output of pixels scanned in response to the block scan driving signal and an output of pixels scanned in response to the thinning-out scan driving signal can be transmitted by means of a common transmitting means.

Moreover, it is possible to set the number of pixels scanned during one frame to a value smaller than the number of all pixels. Therefore, even when a solid-state imaging device enjoying a high density of pixels is employed, if the number of pixels is confined to the same level as the number of pixels treated in, for example, an NTSC-conformable equipment, a known transmitting means capable of transmitting a relatively small amount of information can be utilized.

Figure 9:
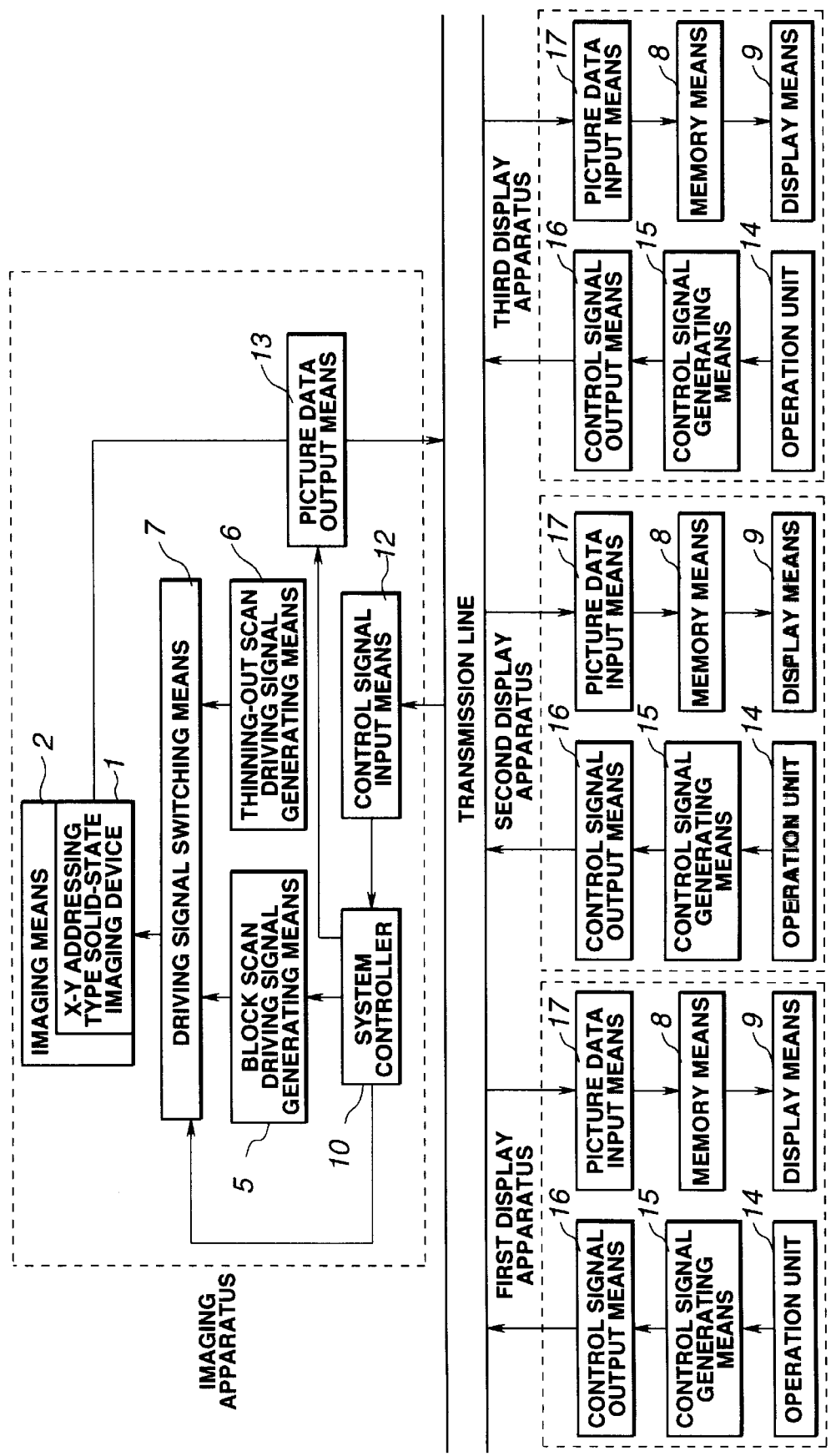
FIG. 9 is a block diagram showing the configurations of an imaging apparatus and a plurality of display apparatuses included in an imaging display system of the thirteenth embodiment of the present invention.

FIG. 9 is a block diagram showing the configurations of an imaging apparatus and a plurality of display apparatuses included in an imaging display system of the thirteenth embodiment of the present invention. The description of components in the thirteenth embodiment identical to those in the twelfth embodiment will be omitted. A difference alone will be described mainly.

In the thirteenth embodiment, a plurality of display apparatuses; that is, a first display apparatus, second display apparatus, and third display apparatus are connected to one imaging apparatus over a transmission line.

In the thirteenth embodiment, the control signal output means 16 is designed to append address information serving as identification information of an own display apparatus to a control signal generated by the control signal generating means 15, and to output the resultant control signal to the imaging apparatus.

The system controller 10 for inputting a control signal containing address information of a display apparatus is designed to output the address information of the display apparatus to the picture data output means 13. Furthermore, the picture data output means 13 is designed to append the address information output from the system controller 10 to picture data read from the solid-state imaging device and to output the resultant picture data.

Next, the operation of the thirteenth embodiment will be described.

To begin with, the imaging apparatus is made accessible by the display apparatuses and brought to a wait state in which the imaging apparatus waits for a control signal sent from any of the display apparatuses. For example, when the first display apparatus is set to a state in which the first display apparatus is accessible by handling the operation unit 14, the control signal generating means 15 generates a control signal used to carry out thinning-out read and outputs the signal to the control signal output means 16. The control signal output means 16 appends address information of its own display apparatus, that is, the first display apparatus to the generated control signal, and outputs the resultant control signal to the imaging apparatus over the transmission line. When outputting the control signal, the control signal output means 16 appends address information of the imaging apparatus to the control signal.

The control signal output from the first display apparatus is input to the system controller 10 via the control signal input means 12. The system controller 10 outputs the appended address information of the first display apparatus to the picture data output means 13, and controls the driving signal switching means 7 so as to switch the driving signal to be input to the driving signal switching means 7 to an output of the thinning-out scan driving signal generating means 5. The address information of the first display apparatus is appended to picture data output from the solid-state imaging device 1 in response to the thinning-out scan driving signal by means of the picture data output means 13. The resultant picture data is output from the imaging apparatus.

The picture data is input to the picture data input means 17 in the first display apparatus according to the address information. After being stored in the memory means 8, the picture data is read from the memory means 8. A whole picture produced by carrying out thinning-out read is then displayed by the display means 9. Thinning-out reading of data from the solid-state imaging device and display of a motion picture are carried out until the first display apparatus is handled subsequently or another display apparatus that is the second or third display apparatus is made accessible.

Subsequently, when the second display apparatus is made accessible by handling the operation unit 14, the second display apparatus like the aforesaid first display apparatus appends address information of its own display apparatus that is the second display apparatus to a control signal, and outputs the resultant control signal to the imaging apparatus. The imaging apparatus carries out thinning-out reading, appends the address information of the second display apparatus to read picture data, and outputs the resultant picture data.

At this time, since the first display apparatus and second display apparatus have carried out thinning-out reading, the system controller 10 in the imaging apparatus outputs picture data, which is read from the solid-state imaging device 10 by thinning out pixels during one frame, alternately to the first display apparatus and second display apparatus, and thus updates the picture displays of the display apparatuses.

Even when the third display apparatus is made accessible by handling the operation unit 14, a whole picture produced by carrying out thinning-out read is displayed by the third display apparatus. The imaging apparatus repeatedly outputs picture data, which is read from the solid-state imaging device 1 by thinning out pixels during one frame, successively to the first display apparatus, second display apparatus, and third display apparatus under the control of the system controller 10, and thus updates the picture displays of the display apparatuses.

In this state, when the operation unit 14 in the first display apparatus is handled to carry out block reading, the first display apparatus appends address information of the own display apparatus that is the first display apparatus to a control signal used to carry out block reading, and outputs the resultant control signal to the imaging apparatus. The imaging apparatus reads data from a block that is a designated image area, appends the address information of the first display apparatus to the read picture data, and outputs the resultant picture data.

The picture data is stored in the memory means 8 in the first display apparatus. Picture data read from the memory means 8 is visualized in the form of a still picture by the display means 9 until the display apparatus that is the first display apparatus is handled subsequently. That is to say, for displaying a whole picture produced by carrying out thinning-out reading, a picture to be displayed on the display apparatus is updated and displayed as a motion picture. For displaying a picture corresponding to a partial image area produced by carrying out block reading, a picture is not updated but a picture whose data read first is displayed as a still picture.

In the thirteenth embodiment, the imaging apparatus is designed to transmit picture data to the display apparatuses in response to control signals sent from the display apparatuses. Alternatively, the imaging apparatus may be designed to monitor the display apparatuses in s time-sharing manner sequentially from the first display apparatus through the second display apparatus to the third display apparatus. In this case, when a control signal is generated, the imaging apparatus can transmit picture data according to the control signal. When the imaging apparatus is designed this way, it is necessary for the imaging apparatus to recognize how many display apparatuses are usable. The display apparatuses should therefore be designed so that when any display apparatus is made accessible, the display apparatus can transmit a signal asking permission for use to the imaging apparatus.

Moreover, in the thirteenth embodiment, a plurality of display apparatuses are connected to one imaging apparatus over a transmission line. Since each display apparatus appends address information of the imaging apparatus to a control signal and outputs the resultant control signal, a plurality of imaging apparatuses may be connected.

Figure 10:
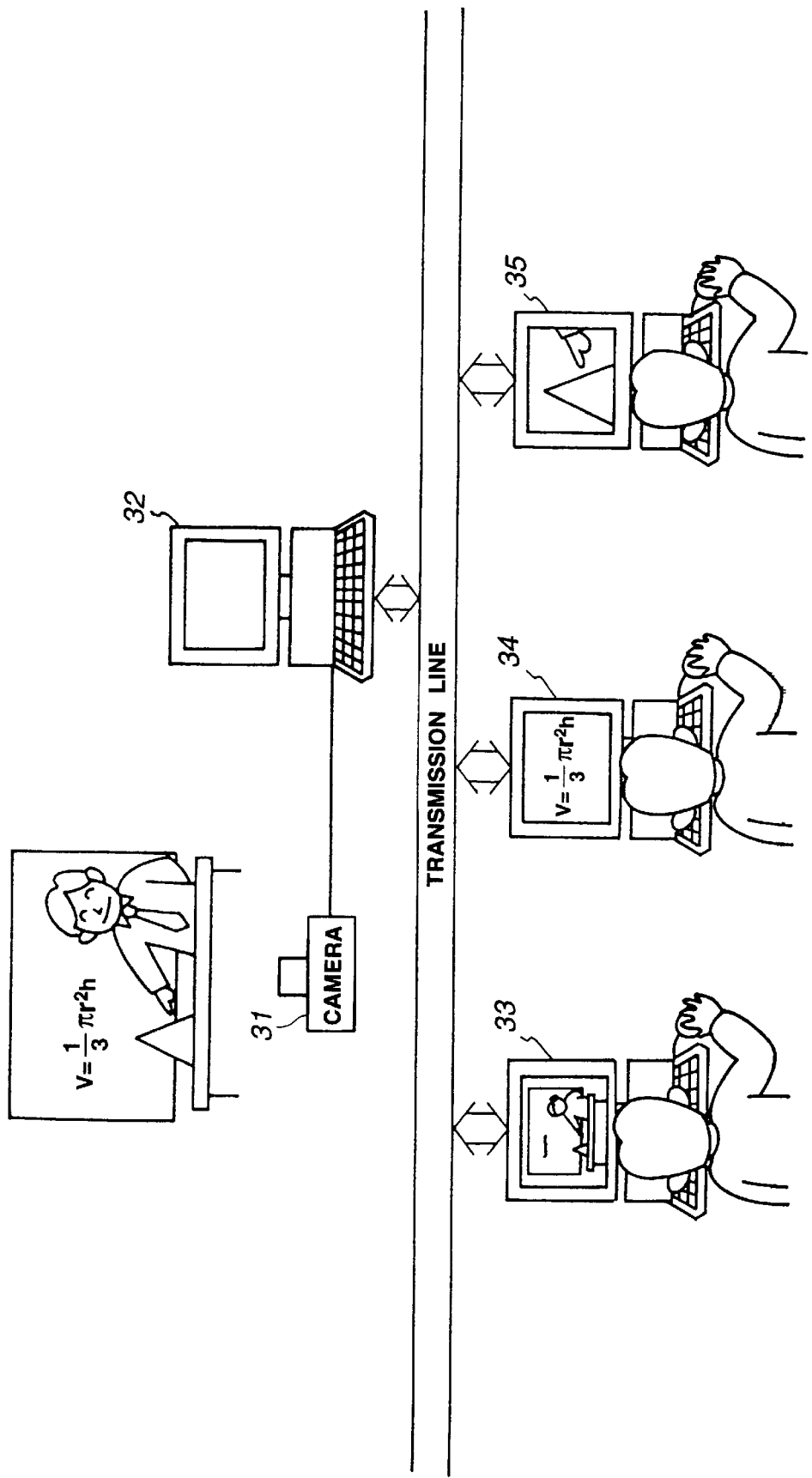
FIG. 10 is a diagram showing a scene of giving remote classes using an imaging display system which is a practical example of implementation of the thirteenth embodiment of the present invention.

FIG. 10 is a diagram showing a scene of conducting remote classes using the imaging display system as a practical example of the thirteenth embodiment.

In FIG. 10, a camera 31 serving as an imaging apparatus and a personal computer 32 connected to the camera 31 over a cable are installed. A personal computer 33 serving as the first display apparatus, a personal computer 34 serving as the second display apparatus, and a personal computer 35 serving as the third display apparatus are connected over a transmission line.

The imaging apparatus that is the camera 31 images a blackboard, an entity placed on a desk, and a teacher which are objects of imaging, and thus visualizes a scene of giving classes. Students control the personal computers 33, 34, and 35 serving as display apparatuses accessible to the imaging apparatus. A whole picture of the scene of giving classes is displayed on the personal computers by reading data from areas indicated with addresses. A student can display a desired picture on his/her personal computer by handling a keyboard or mouse serving as the operation unit 14.

In FIG. 10, the personal computer 33 serving as the first display apparatus displays a whole picture, the personal computer 34 serving as the display apparatus visualizes the blackboard in enlargement, and the personal computer 35 serving as the third display apparatus visualizes the entity on the desk in enlargement.

Figure 11A:
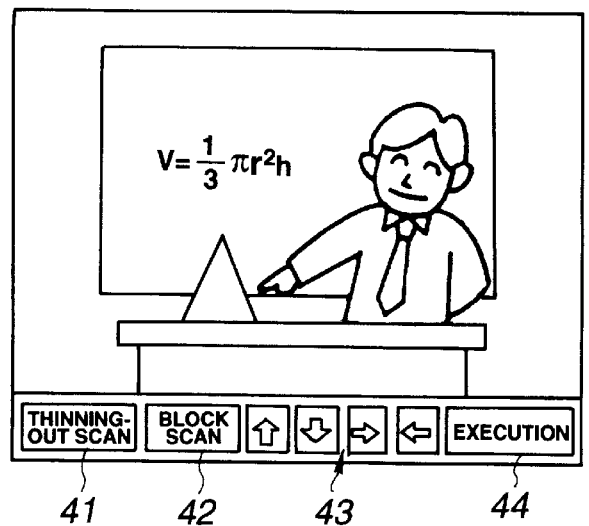
FIGS. 11A, 11B, and 11C are diagrams showing screens of a display apparatus included in the imaging display system of the thirteenth embodiment.
Figure 11B:
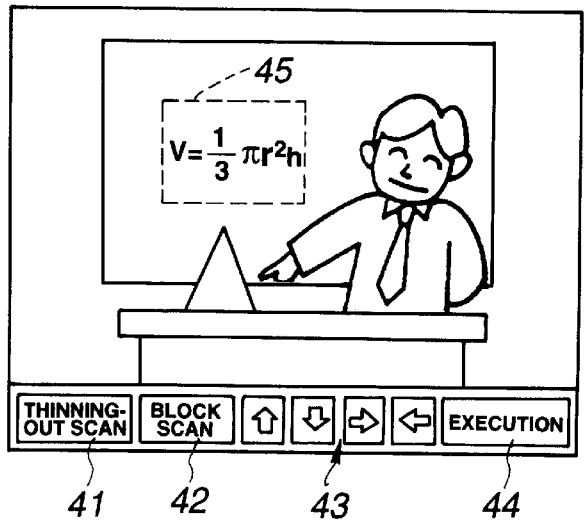
Figure 11C:
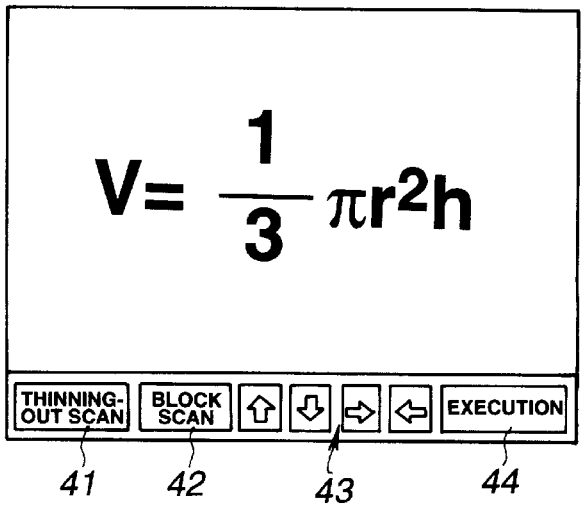

The handling procedure will be described with reference to FIGS. 11A to 11C. FIGS. 11A to 11C are diagrams showing the screens of a personal computer serving as a display apparatus.

FIG. 11A shows a display screen of a whole picture produced by carrying out thinning-out reading. The whole picture can be displayed by making the personal computers 33, 34, and 35 accessible to the imaging apparatus. Buttons with icons indicating operations are lined up on the lower edge of the screen. From left to right, a thinning-out read operation button 41, a block read operation button 42, a designated area moving button 43 composed of four Up, Down, Right, and Left buttons, and an execution button 44 are lined up.

When the whole picture shown in FIG. 11A is displayed, if a specific portion must be displayed in enlargement for viewing by carrying out block read, the mouse serving as the operation unit 14 is clicked with a cursor that is not shown set inside the block read operation button 42. With this handling, as shown in FIG. 11B, a designated area 45 or an area designated to be subjected to block read is defined on the display screen of the whole picture. The size of the designated area 45 is set to one-sixteenth of the display screen of the whole picture.

For moving the designated area 45 to a portion of the whole picture which must be displayed in enlargement for viewing, the mouse is clicked with the cursor set inside any of the Up, Down, Right, and Left buttons of the designated area moving button 43. This causes the designated area 45 to move in directions indicated by clicking the mouse inside the designated area moving button 43. When the designated area 45 is thus moved to a desired position and the mouse is clicked inside the execution button 44, the designated portion is, as shown in FIG. 11C, displayed in enlargement by carrying out block read.

Herein, if the whole picture produced by carrying out thinning-out reading must be displayed for viewing, the mouse is clicked when the cursor is inside the thinning-out read operation button. 41, and then clicked when the cursor is inside the execution button 44. Thereby, the display screen of the whole picture produced by carrying out thinning-out reading, which is shown in FIG. 1A, is retrieved.

The size of the designated area 45 is set to one-sixteenth of the display screen of the whole picture. Alternatively, the size of the designated area may be made arbitrarily variable.

The thirteenth embodiment exerts the same effect as the twelfth embodiment. Besides, a plurality of operators can see the same object located at a remote place, which is visualized by the same imaging apparatus, using their display apparatuses. For example, the imaging display system can be used for remote classes, remote conference, remote medical care, remote sale, remote work, and the like. Moreover, a plurality of operators can see a picture produced through the same field of view and can also see desired portions of the picture in enlargement. This makes it possible to draw out collaboration, which is important for accomplishing remote work, from among a plurality of operators engaged in remote work.

When the imaging apparatus is mounted on, for example, a microscope, an enlarged picture of a desired portion of a pathologic cell that is an object of imaging can be produced by carrying out block reading without the necessity of moving the stage of the microscope. The same sample can be observed by a plurality of viewers. This enables a plurality of pathologists stationed at remote places to carry out remote pathologic diagnosis (tele-pathology).

FIGS. 12 to 18 show the fourteenth embodiment of the present invention. FIG. 12 is a block diagram showing the configurations of an imaging apparatus and display apparatus included in an imaging display system. The description of components in the fourteenth embodiment identical to those in the aforesaid embodiments will be omitted. A difference alone will be mainly described.

The imaging apparatus includes an imaging lens 51 for optically forming an object image on the image plane of the X-Y addressing type solid-state imaging device 1, the imaging means 2 including the solid-state imaging device 1, an imaging device driving means 52 for controlling and driving the imaging means 2 including the solid-state imaging device 1, an image signal processing means 53 for performing given processing on an image signal output from the solid-state imaging device 1 and outputting a resultant signal as a signal conformable to a standard system or an equivalent system, a transmitting means 54 for transmitting a signal carrying picture data processed by the image signal processing means 53 to the display apparatus, and the system controller 10 for controlling the whole imaging apparatus including the imaging device driving means 52, image signal processing means 53, and transmission means 54.

Next, the display apparatus includes a receiving means 55 for receiving the signal carrying picture data from the transmitting means 54 in the imaging apparatus, a first display means 9a for dealing with a standard signal which is a monitor or the like for visualizing picture data received by the receiving means 55 at a standard resolution, a recording means 56 for recording picture data received by the receiving means 55 according to a standard signaling system, a high-definition signal processing means 57 for reconstructing a high-definition signal, which represents a high-definition picture to be displayed, on the basis of picture data received by the receiving means 55 or picture data recorded in the recording means 56, and a second display means 9b for dealing with a high-definition signal which visualizes high-definition picture data processed by the high-definition signal processing means 57.

For communication between the transmitting means 54 in the imaging apparatus and the receiving means 55 in the display apparatus, various means including a wireless communication means and wire communication means can be used.

Figures 17, 18:
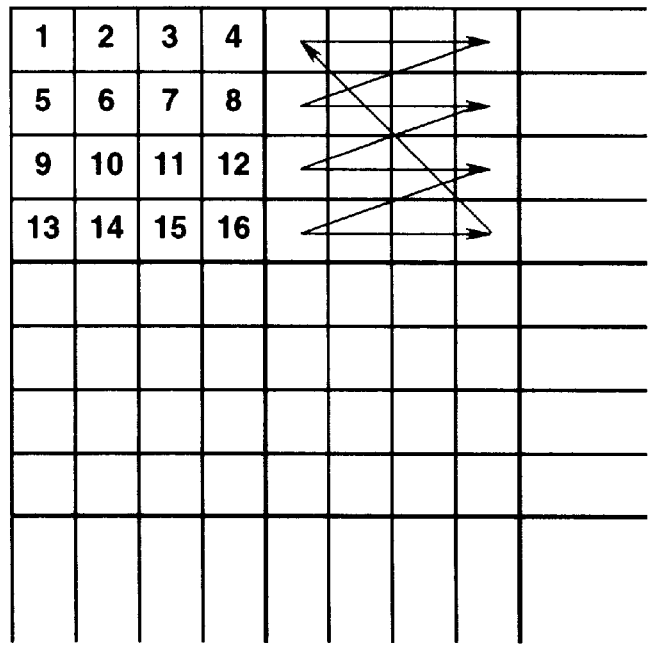
FIG. 17 is a diagram showing the order of pixels whose data is read during the given read cycle in the fourteenth embodiment.
FIG. 18 is a table listing examples of standard signaling systems referred to in the fourteenth embodiment.

As for the foregoing standard signaling system, the systems listed in FIG. 18 are taken for instance.

Specifically, the system stipulating that the number of vertical scanning lines is 525 and the number of fields to be transmitted during one second is 60 includes an EIA system for monochrome display and an NTSC system for color display. The system stipulating that the number of vertical scanning lines is 625 and the number of fields to be transmitted during one second is 50 includes a CCIR system for monochrome display and a PAL or SECAM system for color display.

Figure 13:
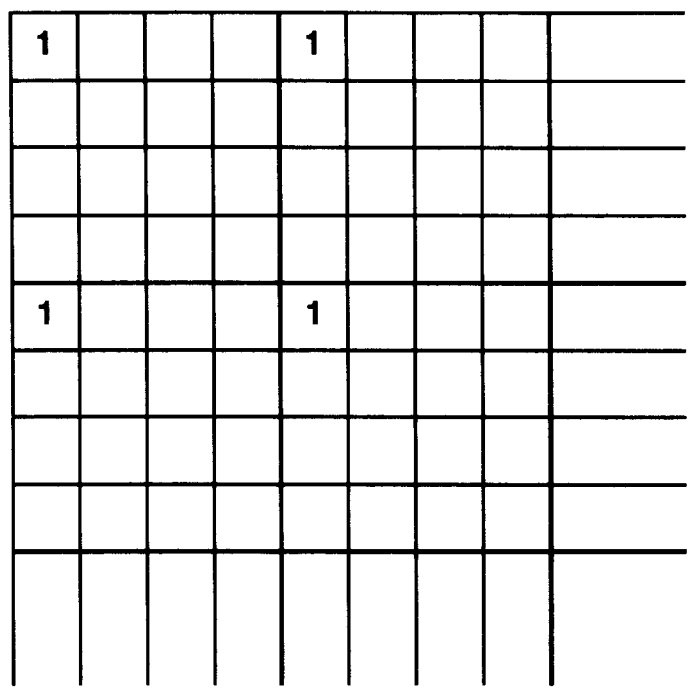
FIG. 13 is a diagram showing locations of pixels to be read first during a given read cycle in the fourteenth embodiment.
Figure 14:
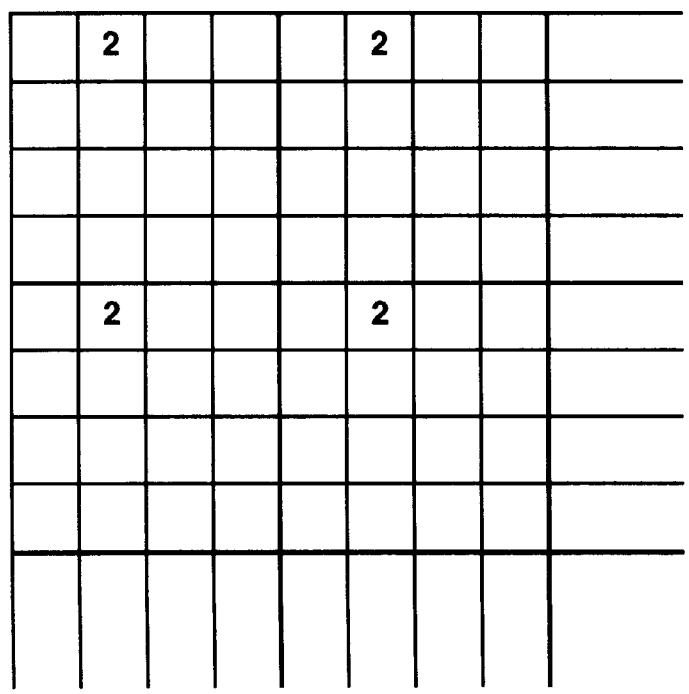
FIG. 14 is a diagram showing locations of pixels to be read secondly during the given read cycle in the fourteenth embodiment.
Figures 15, 16:
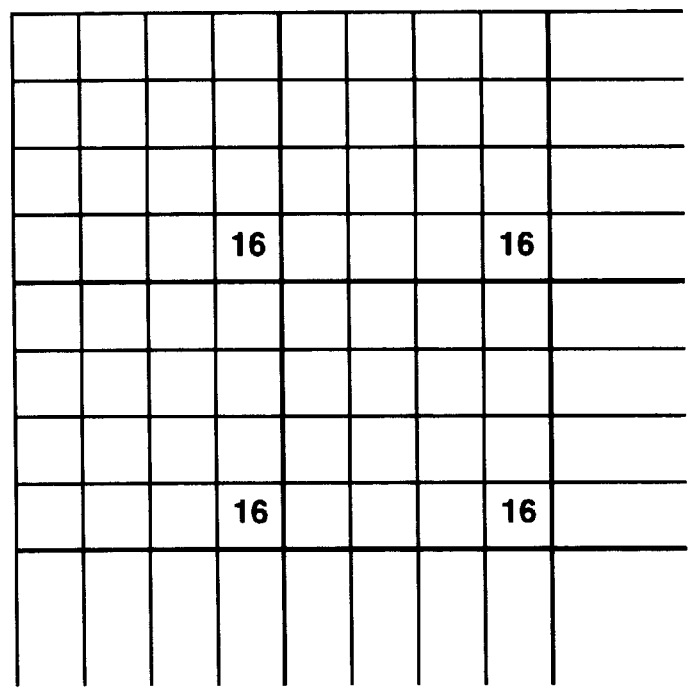
FIG. 15 is a diagram showing locations of pixels to be read last during the given read cycle in the fourteenth embodiment.
FIG. 16 is a diagram showing the relationship of correspondence between the order of pixels whose data is read during the given read cycle and the locations of the pixels in the fourteenth embodiment.

Next, referring to FIGS. 13 to 17, reading data of pixels from the X-Y addressing type solid-state imaging device 1 will be described. FIG. 13 is a diagram showing locations of pixels whose data is read first within a given read cycle, FIG. 14 is a diagram showing locations of pixels whose data is read secondly within the given read cycle, FIG. 15 is a diagram showing locations of pixels whose data is read last within the given read cycle, FIG. 16 is a diagram showing the relationship of correspondence between the order of pixels whose data is read within the given read cycle and the locations thereof, and FIG. 17 is a diagram showing the order of pixels whose data is read within the given read cycle.

Even in this embodiment, the structure of pixels in the whole image area of the solid-state imaging device 1 which is an array of 2048 pixels lengthwise by 2048 pixels sideways will be taken for instance. In the solid-state imaging device 1 having the pixel structure, for approaching the number of pixels to the number of pixels conformable to any of the standard signaling systems, every fourth pixel is extracted by thinning out pixels lengthwise and sideways, and data of the extracted pixel is read. Finally, the number of pixels lying lengthwise is calculated as 2048/4=512, and the number of pixels lying sideways is calculated as 2048/4=512.

In other words, the thinning ratio is $\frac{1}{16}$. During one frame within a read cycle, data of every sixteenth pixel (4 pixels lengthwise by 4 pixels sideways) is read from the whole image area of the solid-state imaging device 1. Conversely, one cycle is composed of 16frames.

First, during the first frame within the read cycle, as shown in FIG. 13, data of pixels each located at a leftmost upper corner of an array of 4 pixels lengthwise by 4 pixels sideways is read. The locations of the pixels whose data is read first may be determined arbitrarily. For convenience' sake, the illustrated locations are determined as the locations of the pixels whose data is read first.

Next, during the second frame within the read cycle, as shown in FIG. 14, data of pixels adjoining rightward the pixels whose data has been read as shown in FIG. 13 is read.

Likewise, while pixels whose data is read are shifted continuously to right-hand adjoining pixels, data is read successively. After data of pixels each located at a rightmost lower corner of the array of 4 pixels lengthwise by 4 pixels sideways is read, as shown in FIG. 17, the pixels are shifted to the pixels each located at the leftmost upper corner of the array and the data of the pixels each located at the leftmost upper corner is read in the same manner as the foregoing one.

Thus, during the last frame that is the sixteenth frame within the read cycle, as shown in FIG. 15, data of pixels each located at the rightmost lower corner of the array of 4 pixels lengthwise by 4 pixels sideways is read.

In other words, when reading data of pixels during one cycle, that is, 16frames is completed, as shown in FIG. 16, data of all pixels of the arrays of 4 pixels lengthwise by 4 pixels sideways is read. In short, data of all the pixels of the solid-state imaging device 1 is read once.

Picture data thus read and subjected to given processing by the image signal processing means 53 is transmitted by the transmitting means 54.

The display apparatus in which the receiving means 55 has received the picture data outputs the picture data as a signal conformable to a standard signaling system or equivalent system, and allows the first display means 9a to display a picture at a standard resolution or records the picture data in the recording means 56.

When a high-definition picture must be displayed for viewing using the picture data received by the receiving means 55 or the picture data recorded in the recording means 56, an output of the receiving means 55 or a reproduced output of the recording means 56 is input to the high-definition signal processing means 57. The high-definition signal processing means 57 uses a signal whose cycle is equivalent to the aforesaid one cycle, that is, the picture data to be transmitted during 16 frames to construct a high-definition signal representing an array of 2048 pixels lengthwise by 2048 pixels sideways according to pre-set information concerning high-definition picture reconstruction. The second display means 9b then displays a high-definition picture.

For reconstructing a high-definition picture, when the degree of definition expressed as 2048 pixels lengthwise by 2048 pixels sideways is not needed, a high-definition picture formed with an array of 1024 pixels lengthwise by 1024 pixels sideways may be reconstructed using pixel data acquired during the first frame, third frame, ninth frame, and eleventh frame.

According to the fourteenth embodiment, pixel data transmitted according to a standard signaling system or equivalent system during a plurality of frames is used to reconstruct a high-definition picture. This enables meticulous observation of an object. Moreover, it is possible to reconstruct a high-definition picture using pixel data stored in the recording means according to a standard signaling system or the like and transmitted during a plurality of frames.

Since it is unnecessary to use a special system to transmit picture data, an object can be observed or picture data of the object can be recorded at a high frame rate. Moreover, relatively simple circuitry is used to reconstruct a high-definition picture if necessary.

Figure 19:
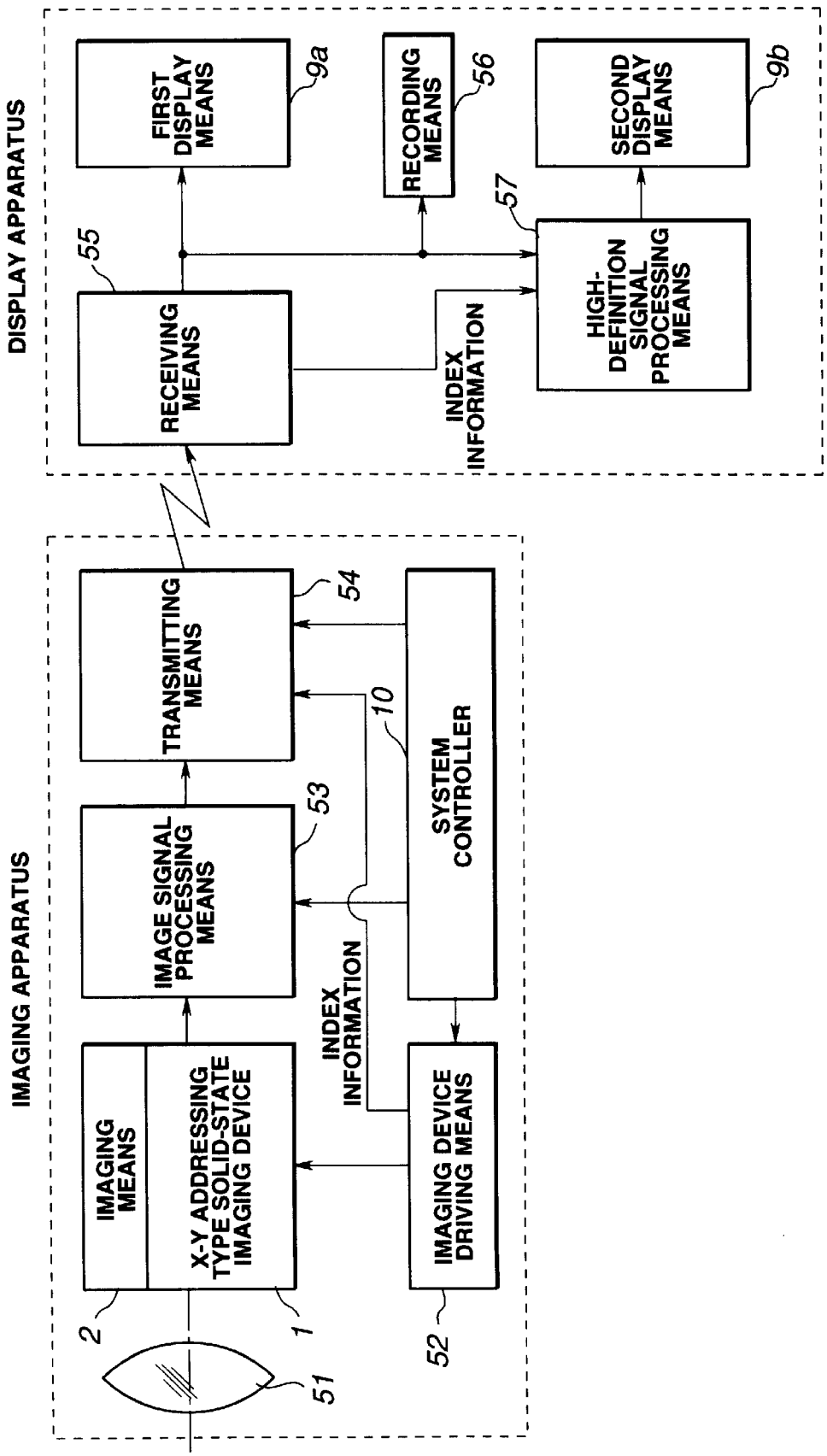
FIG. 19 is a block diagram showing the configurations of an imaging apparatus and display apparatus included in an imaging display system of the fifteenth embodiment of the present invention.
Figure 20:
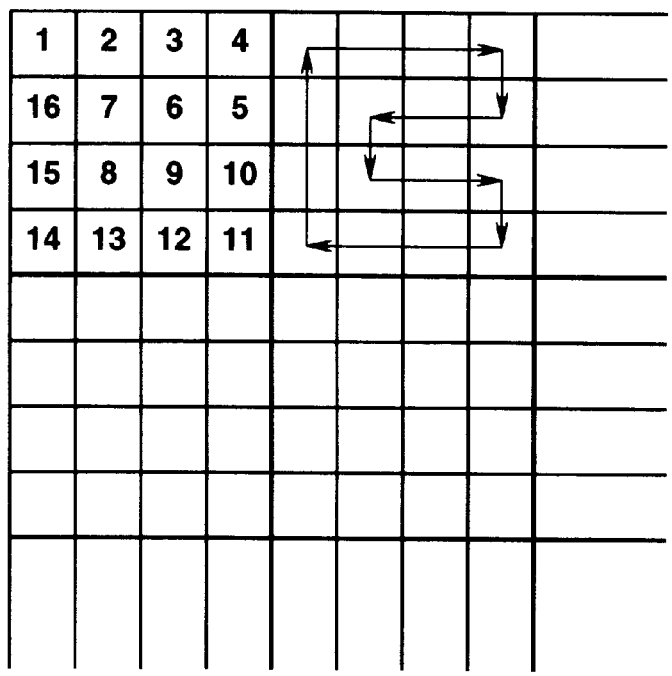
FIG. 20 is a diagram showing the order of pixels whose data is read during a given read cycle in the fifteenth embodiment.

FIGS. 19 and 20 show the fifteenth embodiment of the present invention. FIG. 19 is a block diagram showing the configurations of an imaging apparatus and display apparatus included in an imaging display system. The description of components in the fifteenth embodiment identical to those in the aforesaid embodiments will be omitted. A difference alone will be mainly described.

The configuration of the imaging display system of this embodiment is nearly the same as the fourteenth embodiment. When the solid-state imaging device 1 is driven by the imaging device driving means 52, index information indicating what kind of pixel structure is adopted and in what order pixels are read is sent to the high-definition signal processing means 57 in the display apparatus via the transmitting means 54 and receiving means 55. The index information should preferably be transmitted during a time interval devoid of a picture signal transmitted according to a standard signaling system or the like, for example, a vertical blanking time.

Information to be contained in the index information includes, for example, a pixel structure of the whole image area of the solid-state imaging device 1 (that is, the number of all pixels), the reading order of pixels, a thinning ratio (in the foregoing example, the thinning ratio is $\frac{1}{16}$ because every fourth pixel is extracted by thinning out pixels both lengthwise and sideways), whether or not what is the number of frames constituting one read cycle (in the foregoing example, 16 frames), and the frame number within the one cycle (the number of the current frame within one cycle).

In the display apparatus, the high-definition signal processing means 57 receives the index information via the receiving means 55, and reconstructs a high-definition picture according to the index information. Even when the reading order of pixels are variable, since the index information is input to the display apparatus, the high-definition signal processing means 57 can reconstruct a high-definition picture properly.

The thinning ratio should preferably be the same both lengthwise and sideways normally (in order to prevent a distortion from occurring in a picture). If necessary, however, the thinning ratio may be different between lengthwise and sideways. For example, when the aspect ratio of one pixel is different from the one of a square, the thinning ratio may be different between lengthwise and sideways.

Moreover, in this embodiment, aside from the reading order of pixels shown in FIG. 17, the reading order of pixels shown in FIG. 20 is adopted. FIG. 20 is a diagram showing the order of pixels whose data is read during a given read cycle.

In the illustrated example, when data of an array of 4 pixels lengthwise by 4 pixels sideways is read successively during one cycle, a pixel is shifted continuously to another pixel adjoining the pixel in either a lateral direction or vertical direction. A pixel whose data is read next is always an adjoining pixel. A pixel whose data is read at the sixteenth time is adjoining a pixel whose data is read first during the next cycle. Thus, pixels whose data is read during successive cycles are mutually adjoining.

The adoption of the above reading method enables a picture, which is displayed according to a standard signaling system, to change smoothly at the time of transition from one frame to another. Specifically, in the example shown in FIG. 17, when the fourth frame within one cycle shifts to the fifth frame, a jump is made from a pixel location to another pixel location. When the sixteenth frame shifts to the first frame within a subsequent cycle, a large jump is made in a diagonal direction. According to the reading method shown in FIG. 20, a jump by the length of one pixel or more will not occur at the time of transition from one frame to another. A smoothly-changing picture can be viewed.

The fifteenth embodiment can exert the same effect as the first embodiment. Besides, the display apparatus can reconstruct a high-definition picture using the high-definition signal processing means according to the index information transmitted from the imaging apparatus.

Moreover, when a standard signaling system is adopted, a smoothly-changing picture can be produced by optimizing the reading order of pixels.

Furthermore, even when the reading order of pixels is made variable because it is needed, since index information is input to the display apparatus, the high-definition signal processing means can reconstruct a high-definition picture properly.

FIGS. 21 to 24 show the sixteenth embodiment of the present invention. FIG. 21 is a block diagram showing the configurations of an imaging apparatus and display apparatus included in an imaging display system. The description of components in the sixteenth embodiment identical to those in the aforesaid embodiments will be omitted. A difference alone will be mainly described.

This embodiment provides not only a first mode, in which one pixel is shifted sequentially to another within one cycle so that a high-definition picture can be reconstructed as described in the fourteenth or fifteenth embodiment, but also a second mode in which output data items of a plurality of pixels are added up and read.

Specifically, the display apparatus includes a mode designating means 58 for use in selecting a mode and entering an instruction. An output of the mode designating means is transmitted to the imaging apparatus via a transmitting/receiving means 55A.

The imaging apparatus includes a transmitting/receiving means 54A also serving as a means for receiving mode information from the transmitting/receiving means 55A in the display apparatus. An output of the transmitting/receiving means 54A is input to a system controller 10A having the capability of a mode switching means.

The system controller 10A switches modes, according to which the solid-state imaging device 1 is driven by the imaging device driving means 52, on the basis of received mode information.

Figure 22:
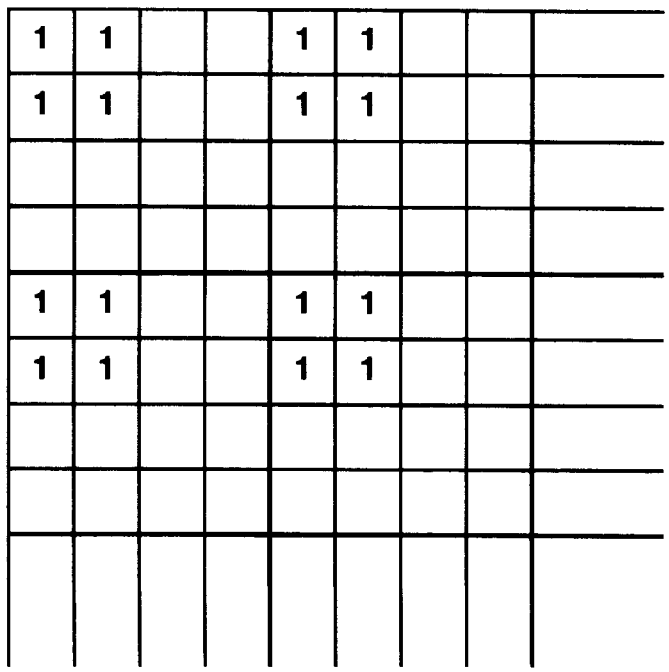
FIG. 22 is a diagram showing an example of a mode intended to add up and read outputs of a plurality of adjoining pixels in the sixteenth embodiment.

Next, referring to FIGS. 22 to 24, an example of the second mode will be described. FIG. 22 is a diagram for explaining an example of a mode in which output data items of a plurality of adjoining pixels are added up and read, FIG. 23 is a diagram for explaining another example of the mode in which output data items of a plurality of adjoining pixels are added up and read, and FIG. 24 is a diagram for explaining yet another example of the mode in which output data items of a plurality of adjoining pixels are added up and read.

The example shown in FIG. 22 is a mode in which data items of four mutually-adjoining pixels (two pixels lengthwise by two pixels sideways) located at a left upper corner of each array of 4 pixels lengthwise by 4 pixels sideways are added up and output. According to this mode, an output that is four times as large in amount as an output of data of one pixel can be provided. Even when the luminance level of an object is low, a bright easy-to-see picture can be produced.

Likewise, the example shown in FIG. 23 is a mode in which data items of 9 mutually-adjoining pixels (3 pixels lengthwise by 3 pixels sideways) located at a left upper corner of each array of 4 pixels lengthwise by 4 pixels sideways are added up and output. The example shown in FIG. 24 is a mode in which data items of all pixels in each array of 4 pixels lengthwise by 4 pixels sideways are added up and output. By adopting either of the modes, a brighter and easier-to-see picture can be produced.

The sixteenth embodiment can exert the same effects as the fourteenth and fifteenth embodiments. Besides, when a high-definition picture or brighter image must be displayed for viewing, optimal setting can be specified by switching the modes. Moreover, switching the modes is performed using the mode designating means in the display apparatus. This provides the merit of good maneuverability.

In the present invention, it will be apparent that a wide range of different working modes can be formed on the basis of the invention without a departure from the spirit and scope of the invention. This invention is not restricted to any specific embodiment except as may be limited by the appended claims.

What is claimed is:

1. An imaging display system for transmitting picture information acquired by an imaging apparatus to a display apparatus and displaying a picture corresponding to the transmitted picture information on said display apparatus, wherein said imaging apparatus includes:

an X-Y addressing type solid-state imaging device;

an imaging device driving means for driving said solid-state imaging device so that pixels in a whole image area of said solid-state imaging device are thinned at a thinning ratio of 1/n (where n is a positive integer) in order to scan specific pixels alone, the specific pixels that are an object of a scan are orderly and regularly shifted frame by frame, and information of all pixels in the whole image area is output during one cycle composed of n frames; and a transmitting means for transmitting picture information output from said solid-state imaging device and thinned at a thinning ratio of 1/n to said display apparatus.

2. An imaging display system according to claim 1, wherein said imaging apparatus further includes a mode switching means for switching a first mode, in which the pixels in the whole image area of said solid-state imaging device are thinned at a thinning ratio of 1/n in order to scan specific pixels alone, the specific pixels are orderly and regularly shifted frame by frame, and information of all the pixels in the whole image area is output during one cycle composed of n frames, to a second mode, in which the pixels in the whole image area of said solid-state imaging device are thinned at a thinning ratio of 1/n in order to scan specific pixels alone on a fixed basis during one frame or in order to scan the specific pixels and adjoining pixels on a fixed basis during one frame while adding up data items of the specific pixels and adjoining pixels, or vice versa.

3. An imaging display system according to claim 2, wherein said display apparatus further includes a mode designating means for use in entering an instruction of selection of either said first mode or said second mode, and a transmitting means for transmitting mode information of a mode designated using said mode designating means to said imaging apparatus; said imaging apparatus further including a receiving means for receiving mode information transmitted from said display apparatus and outputting the mode information to said mode switching means.

4. An imaging display system according to claim 1, wherein picture information thinned at the thinning ratio of 1/n is conformable to a standard signaling system or equivalent system.

5. An imaging display system according to claim 1, wherein said imaging apparatus transmits index information, which contains at least one of information of a thinning ratio, information of the order of specific pixels to be shifted, information of a frame number within one cycle, and information of a pixel structure of the whole image area of said solid-state imaging device, to said display means.

6. An imaging display system according to claim 5, wherein said index information is transmitted while being superposed on picture information.

7. An imaging display system for transmitting picture information acquired by an imaging apparatus to a display apparatus and displaying a picture corresponding to the transmitted picture information on said display apparatus, wherein said imaging apparatus includes:

an X-Y addressing type solid-state imaging device;

an imaging device driving means for driving said solid-state imaging device so that pixels in a whole image area of said solid-state imaging device are thinned at a thinning ratio of 1/n (where n is a positive integer) in order to scan specific pixels alone, the specific pixels that are an object of a scan are orderly and regularly shifted frame by frame, and information of all pixels in the whole image area is output during one cycle composed of n frames; and a transmitting means for transmitting picture information, which is transmitted from said solid-state imaging device and thinned at the thinning ratio of 1/n, to said display apparatus, and said display apparatus includes:

a receiving means for receiving picture information transmitted from said imaging apparatus and thinned at the thinning ratio of 1/n;

a first display means for displaying a picture corresponding to the picture information thinned at the thinning ratio of 1/n;

a signal processing means capable of reconstructing high-definition picture information to be transmitted during one frame based on the picture information thinned at the thinning ratio of 1/n during n frames; and a second display means for displaying a high-definition picture corresponding to the high-definition picture information output from said signal processing means.

* * * * *